US012566421B2

(12) United States Patent
Shao

(10) Patent No.: US 12,566,421 B2
(45) Date of Patent: Mar. 3, 2026

(54) METHOD AND SYSTEM FOR INTELLIGENT MONITORING OF CNC PROCESSING BASED ON INDUSTRIAL INTERNET OF THINGS

(71) Applicant: CHENGDU QINCHUAN IOT TECHNOLOGY CO., LTD., Chengdu (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/963,717

(22) Filed: Nov. 28, 2024

(65) Prior Publication Data

US 2025/0093841 A1     Mar. 20, 2025

(30) Foreign Application Priority Data

Sep. 29, 2024   (CN) ......................... 202411364800.1

(51) Int. Cl.
G05B 19/406         (2006.01)
G05B 19/416         (2006.01)

(52) U.S. Cl.
CPC ....... G05B 19/406 (2013.01); G05B 19/4166 (2013.01); G05B 2219/31439 (2013.01)

(58) Field of Classification Search
None
See application file for complete search history.

(56) References Cited

U.S. PATENT DOCUMENTS 12,455,560 B2 * 10/2025 Shao ................ G05B 19/41875
2006/0089742 A1 * 4/2006 Jalluri ................ G05B 19/4065
                                                          700/174
(Continued)

FOREIGN PATENT DOCUMENTS

CA         2345578 C   *  2/2008   ........... G01B 11/005
CN      107584334 B       5/2019
(Continued)

OTHER PUBLICATIONS

First Office Action in Chinese Application No. 202411364800.1 mailed on Nov. 8, 2024, 19 pages.
(Continued)

*Primary Examiner* — Jennifer L Norton
(74) *Attorney, Agent, or Firm* — PORUS IP LLC

(57)                ABSTRACT
Method for intelligent monitoring of CNC processing based on industrial IoT, implemented by industrial IoT management platform, including: determining a CNC processing parameter and simulated processing data corresponding to the CNC processing parameter by performing a CNC process simulation based on the information to be processed; controlling a CNC processing device to perform the task to be processed based on the CNC processing parameter; collecting actual processing data during a performance of the task to be processed according to a monitoring frequency by a monitoring device; performing a deviation determination on the actual processing data and the simulated processing data; when a result of the deviation determination satisfies a preset alert condition, generating a processing alert instruction and sending the processing alert instruction to an alert device of a user platform; and controlling the CNC processing device to adjust the tool feed step length based on the actual processing data.

10 Claims, 5 Drawing Sheets

Process 200

Obtaining, based on an input device of a perception control platform, information to be processed corresponding to a task to be processed — 210

Determining a CNC processing parameter and simulated processing data corresponding to the CNC processing parameter by performing a CNC process simulation based on the information to be processed — 220

Controlling a CNC processing device of the perception control platform to perform the task to be processed based on the CNC processing parameter — 230

Collecting actual processing data during a performance of the task to be processed according to a monitoring frequency by a monitoring device of the perception control platform — 240

Performing a deviation determination on the actual processing data and the simulated processing data — 250

In response to that a result of the deviation determination satisfies a preset alert condition, generating a processing alert instruction and sending the processing alert instruction to an alert device of a user platform — 260

Controlling the CNC processing device to adjust the tool feed step length based on the actual processing data — 270

(56) References Cited

U.S. PATENT DOCUMENTS

| 2017/0308053 A1 * | 10/2017 | Kunimoto | G05B 19/404 |
| 2020/0133225 A1 * | 4/2020 | Hada | G05B 19/19 |
| 2021/0170538 A1 * | 6/2021 | Chang | G05B 19/182 |
| 2021/0220993 A1 * | 7/2021 | Zhao | B25J 9/1664 |
| 2023/0057688 A1 * | 2/2023 | Bretschneider | B23Q 15/12 |
| 2023/0264314 A1 | 8/2023 | Wunderlich et al. | |
| 2023/0400830 A1 | 12/2023 | Tao et al. | |
| 2024/0361747 A1 * | 10/2024 | Gray | G05B 19/40937 |
| 2024/0427314 A1 * | 12/2024 | Ishiwari | G05B 23/02 |
| 2025/0181050 A1 * | 6/2025 | Suzuki | G05B 19/4093 |
| 2025/0208612 A1 * | 6/2025 | Shao | G05B 19/41875 |
| 2025/0306574 A1 * | 10/2025 | Shao | G05B 19/41845 |

FOREIGN PATENT DOCUMENTS

| CN | 115542866 A | 12/2022 |
| CN | 117826704 A | 4/2024 |
| CN | 118317122 A | 7/2024 |
| KR | 20150101203 A | 9/2015 |

OTHER PUBLICATIONS

Notification to Grant Patent Right for Invention in Chinese Application No. 202411364800.1 mailed on Nov. 28, 2024, 4 pages.

* cited by examiner

System 100

Process 200

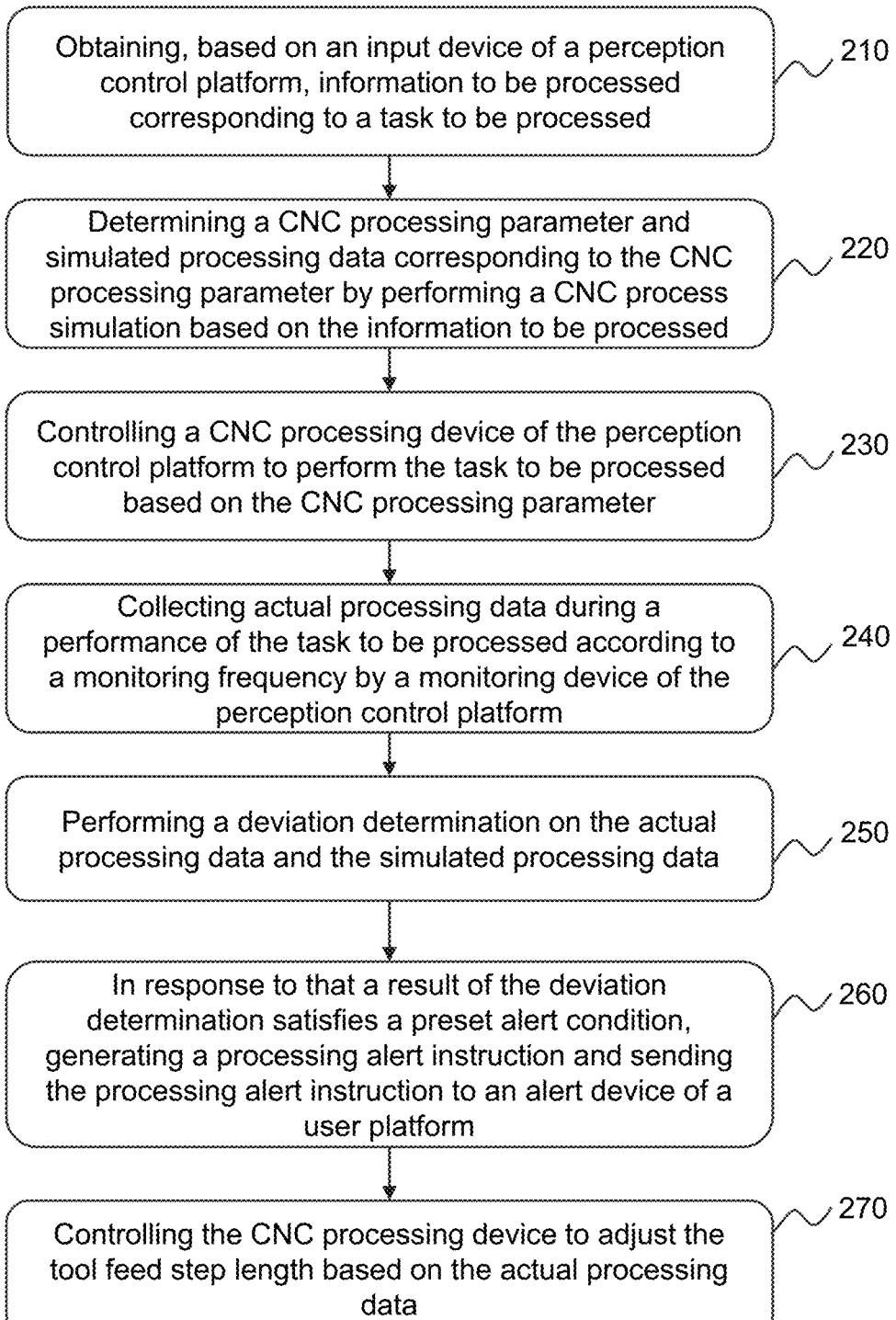

Obtaining, based on an input device of a perception control platform, information to be processed corresponding to a task to be processed ～ 210

Determining a CNC processing parameter and simulated processing data corresponding to the CNC processing parameter by performing a CNC process simulation based on the information to be processed ～ 220

Controlling a CNC processing device of the perception control platform to perform the task to be processed based on the CNC processing parameter ～ 230

Collecting actual processing data during a performance of the task to be processed according to a monitoring frequency by a monitoring device of the perception control platform ～ 240

Performing a deviation determination on the actual processing data and the simulated processing data ～ 250

In response to that a result of the deviation determination satisfies a preset alert condition, generating a processing alert instruction and sending the processing alert instruction to an alert device of a user platform ～ 260

Controlling the CNC processing device to adjust the tool feed step length based on the actual processing data ～ 270

FIG. 2

METHOD AND SYSTEM FOR INTELLIGENT MONITORING OF CNC PROCESSING BASED ON INDUSTRIAL INTERNET OF THINGS

CROSS REFERENCE TO RELATED APPLICATIONS

This application claims priority to Chinese Patent Application No. 202411364800.1, filed on Sep. 29, 2024, the entire contents of which are incorporated herein by reference.

TECHNICAL FIELD

The present disclosure relates to the field of computer numerical control (CNC) processing technology, and in particular relates to a method for intelligent monitoring of CNC processing based on an industrial Internet of Things.

BACKGROUND

With an arrival of the industry 4.0 era, intelligent manufacturing industrial upgrading becomes an urgent need for a high-quality development of the manufacturing industry. Computer numerical control (CNC) processing, as an important support point for the manufacturing industry, is gradually becoming intelligent and networked. However, the CNC processing process leads to a low productivity, an improper maintenance and use of tools due to factors such as a single monitoring manner, an incomplete data collection, an insufficient data analysis capability, a reliance on manual monitoring and management, etc.

To solve the above problem, CN107584334B discloses a kind of complex structural member numerical control processing cutter status real time monitor method based on deep learning. A deep learning network is trained by a great count of CNC processing monitoring signals, which realizes a real-time monitoring of a tool status. However, the method is unable to comprehensively monitor a processing temperature, a material to be processed, etc., during the CNC processing, and is unable to meet requirements of industrial intelligence.

Therefore, it is desired to provide a method for intelligent monitoring of CNC processing based on an industrial internet of things (IoT), which helps to realize comprehensive monitoring, data analysis, and intelligent control of the CNC processing process to improve productivity, guarantee a processing quality, and reduce a failure occurrence.

SUMMARY

One of the embodiments of the present disclosure provides a method for intelligent monitoring of computer numerical control (CNC) processing based on an industrial internet of things (IoT) implemented by an industrial IoT management platform. The method includes: obtaining, based on an input device of a perception control platform, information to be processed corresponding to a task to be processed; determining a CNC processing parameter and simulated processing data corresponding to the CNC processing parameter by performing a CNC process simulation based on the information to be processed, the CNC processing parameter including a tool feed step length; controlling a CNC processing device of the perception control platform to perform the task to be processed based on the CNC processing parameter; collecting actual processing data during a performance of the task to be processed according to a monitoring frequency by a monitoring device of the perception control platform; performing a deviation determination on the actual processing data and the simulated processing data; in response to that a result of the deviation determination satisfies a preset alert condition, the method further includes: generating a processing alert instruction and sending the processing alert instruction to an alert device of a user platform; and controlling the CNC processing device to adjust the tool feed step length based on the actual processing data.

One of the embodiments of the present disclosure provides a system for intelligent monitoring of computer numerical control (CNC) processing based on an Industrial Internet of Things (IoT), including a user platform, a service platform, an industrial IoT management platform, a sensor network platform, and a perception control platform. The industrial IoT management platform includes a production process management sub-platform, a data center, and a device management sub-platform. The industrial IoT management platform is configured to: obtain, based on an input device of the perception control platform, information to be processed corresponding to a task to be processed; determine a CNC processing parameter and simulated processing data corresponding to the CNC processing parameter by performing a CNC process simulation based on the information to be processed, the CNC processing parameter including a tool feed step length; control a CNC processing device of the perception control platform to perform the task to be processed based on the CNC processing parameter; collect actual processing data during a performance of the task to be processed according to a monitoring frequency by a monitoring device of the perception control platform; perform a deviation determination on the actual processing data and the simulated processing data; in response to that a result of the deviation determination satisfies a preset alert condition, the management platform is configured to: generate a processing alert instruction and send the processing alert instruction to an alert device of the user platform; and control the CNC processing device to adjust the tool feed step length based on the actual processing data.

One of the embodiments of the present disclosure provides a non-transitory computer-readable storage medium. The storage medium stores computer instructions, and when a computer reads the computer instructions, the computer executes the method for intelligent monitoring of Computer numerical control (CNC) processing.

Some embodiments of the present disclosure include at least the following beneficial effects:

(1) by performing a CNC process simulation based on the information to be processed, determining the CNC processing parameter and simulated processing data corresponding to the CNC processing parameter, collecting actual processing data in an actual processing process, and generating a processing alert instruction and adjusting the tool feed step length based on the results of the deviation determination, which carries out a comprehensive and intelligent monitoring of the CNC processing process, alert and simultaneously adjust the tool feed step length in a situation where a position deviation or a cutting force deviation does not satisfy the requirements, which guarantees an processing quality, reduces a production cost, and enhances a flexibility and applicability of the CNC processing.

(2) By determining the processing quality of the product through measurement data of a three-size model of the product and product size data, the quality of the product processing is intuitively and accurately determined, and a level of intelligence of CNC processing is improved.

(3) By dynamically adjusting the monitoring frequency through a difference between an estimated deviation value and a first level deviation threshold, a flexibility of monitoring a sub-route is improved, so as to improve the intelligence of the monitoring of the CNC processing while ensuring the comprehensive monitoring of the CNC processing process.

(4) By predicting the estimated deviation value of the sub-route through a deviation analysis model, it helps to quickly and accurately determine the monitoring frequency of the sub-route by utilizing a self-learning capability of a machine learning model and finding patterns in a great amount of data.

(5) By predicting future deformation data in combination with temperature data, and then determining an estimated comprehensive deviation, the comprehensive deviation in the future processing process is predicted in advance, which provides an early warning, and improves the intelligence and accuracy of the CNC processing.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same counting denotes the same structure, wherein:

FIG. 2 is a flowchart illustrating an exemplary method for intelligent monitoring of CNC processing based on an industrial IoT according to some embodiments of the present disclosure;

DETAILED DESCRIPTION

Figure 1:
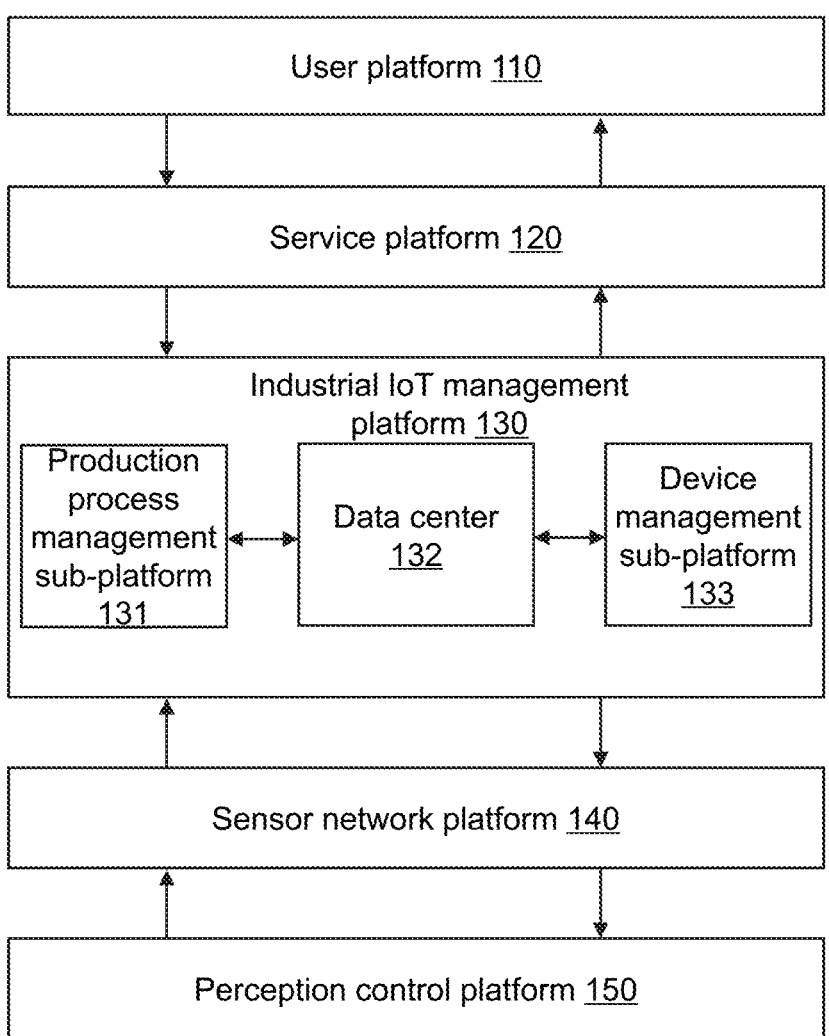
FIG. 1 is a diagram illustrating a platform structure of a system for intelligent monitoring of CNC processing based on an industrial Internet of Things (IoT) according to some embodiments of the present disclosure.

To more clearly illustrate the technical solutions of the embodiments of the present disclosure, the following briefly describes the accompanying drawings to be used in the description of the embodiments. Obviously, the accompanying drawings in the following description are only some examples or embodiments of the present disclosure, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit," and/or "module" as used herein are a way to distinguish between different components, elements, parts, sections, or assemblies at different levels. However, the words are replaced by other expressions if other words accomplish the same purpose.

As shown in the present disclosure and the claims, unless the context clearly suggests an exception, the words "a," "an," and/or "the" do not refer specifically to the singular, but also include the plural. Generally, the terms "including" and "comprising" suggest only the inclusion of clearly identified operations and elements that do not constitute an exclusive list, and the method or apparatus may also include other operations or elements.

Flowcharts are used in the present disclosure to illustrate operations performed by a system according to embodiments of the present disclosure. It should be appreciated that the preceding or following operations are not necessarily performed in an exact sequence. Instead, operations are processed in reverse order or simultaneously. Also, it is possible to add other operations to these processes, or to remove one operation or operations from these processes.

When parts are processed using a CNC processing device, monitoring devices such as cameras and sensors are commonly used to monitor the CNC processing process and to provide an early warning when there is an anomaly. However, the CNC processing lasts for a long period of time, and the monitoring by the monitoring devices is less efficient. CN107584334B realizes a real-time monitoring of a tool status through a deep learning model, which improves the intelligence and efficiency of monitoring the CNC processing process to a certain extent, but is unable to comprehensively monitor the processing temperature, the material to be processed, etc. during the CNC processing process. In view of the above, in some embodiments of the present disclosure, by performing a CNC process simulation on the information to be processed, a CNC processing parameter and corresponding simulated processing data are determined; a CNC processing device of the perception control platform is controlled to perform the task to be processed based on the CNC processing parameter; at the same time, actual processing data is collected during the performance of the task to be processed according to a monitoring frequency by the monitoring device of the perception control platform; and a deviation determination on the actual processing data and the simulated processing data is performed, and the corresponding alarm and adjustment strategy is implemented, which contributes to implementation of an industrial intelligent monitoring to guarantee a processing quality and improve production efficiency.

FIG. 1 is a diagram illustrating a platform structure of a system for intelligent monitoring of CNC processing based on an industrial IoT according to some embodiments of the present disclosure.

As shown in FIG. 1, a system for intelligent monitoring of CNC processing 100 based on the industrial IoT (hereinafter referred to as the CNC processing intelligent monitoring system 100) includes a user platform 110, a service platform 120, an industrial IoT management platform 130, a sensor network platform 140, and a perception control platform 150.

The user platform 110 refers to a platform for interacting with a user. In some embodiments, the user platform 110 includes a user terminal, etc. The user terminal refers to one or more terminal devices or software used by the user. For example, the user terminal includes a mobile device, a tablet computer, a laptop computer, etc. The user includes a user or an operator of the system for intelligent monitoring of CNC processing.

The service platform 120 refers to a platform used to provide an industrial IoT management service to the user. The service platform 120 provides an input and output service to the user. In some embodiments, the service platform 120 interacts with the industrial IoT management platform 130 and the user platform 110. For example, the service platform 120 obtains a processing alert instruction uploaded by the industrial IoT management platform 130 and sends the processing alert instruction to an alert device of the user platform 110.

The industrial IT management platform 130 refers to a comprehensive management platform for data related to the operation of devices. In some embodiments, the industrial IoT management platform 130 interacts with the service platform 120 and the sensor network platform 140. In some embodiments, the industrial IoT management platform 130 is configured with a processor. The processor is used to process information and/or data related to a system for intelligent monitoring of CNC. In some embodiments, the processor processes data, information, and/or processing results obtained from other devices or components of the system, and performs program instructions based on such data, information, and/or processing results to perform one or more functions described in the present disclosure.

In some embodiments, the industrial IoT management platform 130 is configured to: obtain, based on an input device of the perception control platform 150, information to be processed corresponding to a task to be processed; determine a CNC processing parameter and simulated processing data corresponding to the CNC processing parameter by performing a CNC process simulation based on the information to be processed, the CNC processing parameter including a tool feed step length; control a CNC processing device of the perception control platform 150 to perform the task to be processed based on the CNC processing parameter; collect actual processing data during a performance of the task to be processed according to a monitoring frequency by a monitoring device of the perception control platform 150; perform a deviation determination on the actual processing data and the simulated processing data; in response to that a result of the deviation determination satisfies a preset alert condition: generate a processing alert instruction and send the processing alert instruction to an alert device of the user platform 110; and control the CNC processing device to adjust the tool feed step length based on the actual processing data.

In some embodiments, the industrial IoT management platform 130 is further configured to: generate a simulated processing parameter based on the information to be processed; generate a CNC processing program according to a programming rule based on the simulated processing parameter; simulate the CNC processing program and recording the simulated processing data; verify the simulated processing parameter based on the simulated processing data; and determine the CNC processing parameter and the simulated processing data corresponding to the CNC processing parameter based on a verification result of the simulated processing parameter.

In some embodiments of the present disclosure, the industrial IoT management platform 130 is further configured to: in response to that an estimated comprehensive deviation exceeds a first level deviation threshold, determine a candidate processing parameter through an adjustment model based on the estimated comprehensive deviation, the first level deviation threshold, a current processing parameter, and a current processing progress, the adjustment model being a machine learning model; verify the candidate processing parameter; and determine the CNC processing parameter for a sub-route of a tool route based on a verification result of the candidate processing parameter.

In some embodiments of the present disclosure, the industrial IoT management platform 130 is further configured to: divide the tool route to determine the sub-route; determine, based on the CNC processing parameter of the sub-route, an estimated deviation value corresponding to the sub-route; and determine the monitoring frequency for the sub-route based on the estimated deviation value.

In some embodiments of the present disclosure, the industrial IoT management platform 130 is further configured to: determine curvatures at different points on the tool route; determine a curvature change value of two adjacent points; and cluster the points based on the curvature change value to determine the sub-route.

In some embodiments of the present disclosure, the industrial IoT management platform 130 is further configured to: perform a single-point deviation determination and a multi-point deviation determination; the single-point deviation determination includes: in response to that a position deviation of the tool exceeds a first level deviation threshold, determining a position abnormity of the tool and generating the first-level alert instruction, the position deviation being a deviation between an actual coordinate position of the tool and a simulated coordinate position of the tool; the multi-point deviation determination includes: in response to that the position deviation is between the first level deviation threshold and a second level deviation threshold, performing a multi-level determination based on a deviation point ratio, the second level deviation threshold being less than the first level deviation threshold. The multi-level determination includes: in response to that the deviation point ratio exceeds a first level ratio threshold, determining the position abnormity of the tool and generating the first-level alert instruction; and in response to that the deviation point ratio is lower than the first level ratio threshold and higher than a second ratio threshold, determining the position abnormity of the tool and generating the second-level alert instruction.

In some embodiments of the present disclosure, the industrial IoT management platform 130 is further configured to: generate a three-dimensional (3D) model of a product based on the actual processing data; extract measurement data of the 3D model; and determine the processing quality of the product based on the measurement data and product size data.

In some embodiments of the present disclosure, the industrial IoT management platform 130 includes a production process management sub-platform 131, a data center 132, and a device management sub-platform 133.

The production process management sub-platform 131 refers to a platform that manages a production process. In some embodiments of the present disclosure, the production process management sub-platform 131 is configured to determine the CNC processing parameter. In some embodiments of the present disclosure, the production process management sub-platform 131 interacts with the data center 132. For example, the production process management sub-platform 131 uploads the CNC processing parameter to the data center 132.

The data center 132 refers to a platform for storing various databases, as well as various data in an operation process of the device. In some embodiments of the present disclosure, the data center 132 is configured as a storage device for storing data related to the operation of the device, etc.

The device management sub-platform 133 refers to a platform that manages devices. In some embodiments of the present disclosure, the device management sub-platform 133 is used to determine the monitoring frequency based on data during the operation of the device; and to generate the processing alert instruction. In some embodiments of the present disclosure, the device management sub-platform 133 interacts with the data center 132. For example, the device management sub-platform 133 uploads the monitoring frequency to the data center 132.

The sensor network platform 140 refers to a platform that performs a comprehensive management of sensor information. In some embodiments of the present disclosure, the sensor network platform 140 is configured as a communication network or a gateway, etc.

The perception control platform 150 refers to a platform that performs a perception control during the CNC processing. In some embodiments of the present disclosure, the perception control platform 150 includes an input device, an alert device, a CNC processing device, a monitoring device, etc.

The input device refers to a device or apparatus for receiving input information from the user. For example, the input device includes a keyboard, a mouse, a touch screen, an interface import, etc. The alert device refers to a device that provides an early warning during a CNC processing process. For example, the alert device includes a screen, a loudspeaker, and a terminal device carried by the user that issues an alert, etc.

The CNC processing device refers to a device that performs the CNC processing, such as a CNC machine tool.

The monitoring device refers to a device related to monitoring a CNC processing process. Exemplarily, the monitoring device includes a device for monitoring a position of a tool, such as a 3D high-definition camera, a motion sensor, etc. Exemplarily, the monitoring device also includes a device for monitoring a cutting force of the tool, such as a pressure sensor, etc.

More on each of the above platforms may be found in FIG. 2-FIG. 5 and their related descriptions.

In some embodiments of the present disclosure, based on the CNC processing intelligent monitoring system 100, it is possible to form a closed-loop of information operation between various functional platforms, coordinate and operate regularly, and realize informatization and intelligence of the CNC processing monitoring.

FIG. 2 is a flowchart illustrating an exemplary method for intelligent monitoring of CNC processing based on an industrial IoT according to some embodiments of the present disclosure. In some embodiments of the present disclosure, a process 200 is performed by an industrial IoT management platform of the CNC processing intelligent monitoring system 100. As shown in FIG. 2, the process 200 includes the following operations:

In 210, obtaining, based on an input device of a perception control platform, information to be processed corresponding to a task to be processed.

The task to be processed refers to a processing task to be performed by a CNC processing device.

The information to be processed refers to information related to the task to be processed. In some embodiments of the present disclosure, the information to be processed includes processing drawing information, to-be-processed part information, and device information, etc.

The processing drawing information refers to drawing information corresponding to a target processing part. For example, the processing drawing information includes drawing information, tolerance information, a surface roughness requirement, a processing accuracy, etc. of the target processing part. The target processing part refers to parts to be processed after the CNC processing. The parts to be processed refer to raw materials that need to be CNC processed.

The to-be-processed part information refers to information related to the parts to be processed. For example, the to-be-processed part information includes a shape, a size, a size tolerance, material information, etc. of the parts to be processed.

The device information refers to information related to the CNC processing device. For example, the device information includes information such as a specification of the CNC processing device, the processing accuracy, and a service life, etc.

In some embodiments of the present disclosure, the industrial IoT management platform obtains the task to be processed input by a user and the information to be processed corresponding to the task to be processed based on the input device of the perception control platform. Related descriptions of the perception control platform and the input device may be found in FIG. 1 and its description.

In 220, determining a CNC processing parameter and simulated processing data corresponding to the CNC processing parameter by performing a CNC process simulation based on the information to be processed.

The CNC process simulation refers to a simulation of the CNC processing process.

The CNC processing parameter refers to a parameter related to performing the CNC processing. For example, the CNC processing parameter includes a processing sequence, a tool, a fixture, a gauge, a tool route, a tool feed step length, etc.

The processing sequence refers to an order in which the parts to be processed are processed, e.g., the processing sequence includes a counterclockwise processing or a clockwise processing, etc. In some embodiments of the present disclosure, the processing sequence includes a processing sequence in an axial direction of the parts to be processed, a processing sequence in a circumferential direction of the parts to be processed, etc.

The tool refers to an implement used to cut the parts to be processed. The fixture refers to an implement used to clamp the parts to be processed. The gauge refers to an implement for measuring the parts to be processed.

The tool route refers to a trajectory of the tool relative to the parts to be processed during the CNC processing process.

The tool feed step length refers to an amount of tool feed. For example, if the tool feed step length is 0.5 mm, the tool feed is 0.5 mm, and the tool cuts 0.5 mm of the parts to be processed. The smaller the tool feed step length, the higher the corresponding processing accuracy and the slower a processing speed.

The simulated processing data refers to processing data related to a simulated CNC processing process obtained through the CNC process simulation. In some embodiments, the simulated processing data includes a simulated coordinate position and a simulated cutting force of the tool. The simulated coordinate position refers to a coordinate position of a tool simulation obtained through the CNC process simulation. The simulated cutting force refers to a cutting force of the tool simulated by the CNC process simulation.

In some embodiments, the industrial IoT management platform performs the CNC process simulation based on the information to be processed and determines the CNC processing parameter and the simulated processing data corresponding to the CNC processing parameter.

In some embodiments, the process of CNC process simulation includes the following operations S221-S223.

In S221, by the first preset rule, determining, based on the information to be processed, the simulated processing parameter is determined.

The simulated processing parameter refers to the CNC processing parameter used for the simulated CNC processing process.

The first preset rule refers to a preset rule for determining the simulated processing parameter. In some embodiments, the first preset rule is constructed based on an expert knowledge base as well as historical processing data. The historical processing data refers to processing data corresponding to a historical CNC processing process, which is obtained based on historical data.

The first preset rule includes a processing sequence rule, a maximum tool feed step length rule, a rotation speed rule, an implement selection rule, and a tool route rule, etc.

The processing sequence rule refers to a rule that determines the processing sequence in the simulated processing parameter. The processing sequence rule is preset by a technician based on the device information in the information to be processed.

The maximum tool feed step length rule refers to a rule used to determine a maximum tool feed step length for the tool. The maximum tool feed step length rule includes the tolerance information in the information to be processed and a mapping relationship between the device information and the maximum tool feed step length. The foregoing mapping relationship is preset by the technician based on the processing accuracy in the device information. An exemplary mapping relationship is that the smaller the tolerance and the higher the processing accuracy, the smaller the corresponding maximum tool feed step length.

The rotation speed rule refers to a rule used to determine the rotation speed of the CNC processing device. The higher the rotation speed of the CNC processing device, the greater the processing speed, the greater the surface roughness of the target processing part, and the lower the processing accuracy. The rotation speed rule includes a mapping relationship between the processing accuracy in the information to be processed and the rotation speed of the CNC processing device, and the foregoing mapping relationship is preset by the technician based on the device information.

The implement selection rule refers to a rule used to determine the implement selected for the CNC processing process. The implement includes a tool, a fixture, a gauge, etc.

The implement selection rule includes a mapping relationship between the to-be-processed part information and the fixture, which is preset by the technician. The technician selects a corresponding fixture based on the shape, the size, and the material information of the parts to be processed to avoid damage to the parts to be processed during the CNC processing.

The implement selection rule also includes a mapping relationship between the material, the processing accuracy, and the tool of the parts to be processed, which is preset by the technician. The technician selects the corresponding tool based on the material of the parts to be processed and the processing accuracy, so as to ensure that the tool effectively processes the parts to be processed and to avoid problems such as a loss of the tool and an insufficient processing accuracy, etc.

The implement selection rule also includes a mapping relationship between the size information, the tolerance information, and the gauge of the target processing part, which are preset by the technician. The technician selects the corresponding gauge based on the size information and the tolerance information of the target processing part to accurately measure whether a cutting amount meets the requirements.

The tool route rule refers to a rule for determining the tool route. The tool route rule is preset by the technician based on the information to be processed.

In some embodiments, the industrial IoT management platform determines the simulated processing parameter based on the information to be processed based on the above-described first preset rule.

For example, the industrial IoT management platform determines the processing sequence in the simulated processing parameter based on the processing sequence rule; determines the fixture, the cutting tool, and the gauge in the simulated processing parameter based on the implement selection rule; and determines the tool route of the simulated processing parameter based on the tool route rule.

For another example, the industrial IoT management platform determines the tool feed step length in the simulated processing parameter based on the maximum tool feed step length rule and the information to be processed. The industrial IoT management platform determines, based on the size information of the target processing part in the information to be processed and the sizes of the parts to be processed, a size difference between the target processing part and the parts to be processed, and thereby determining the cutting amount of different parts of the parts to be processed; and determines, based on the cutting amount and the maximum tool feed step length, the tool feed step length in the simulated processing parameter.

Exemplarily, the parts to be processed is a cylindrical blank with a diameter of 6 cm, and the diameter of part A of the target processing part is 5 cm, then the size difference between the target processing part and the parts to be processed at the part A is 1 cm, i.e., the cutting amount at the part A is 1 cm, and the maximum tool feed step length determined based on the maximum toll feed step length rule is 1 mm, and the tolerance information is 0.2 cm, then the tool feed step length is as follows: the tool feed step length of first 9 turns is 1 mm, and the tool feed step length of the second 5 turns is 0.2 mm.

In S222, by CNC simulation software, performing a simulated processing based on the simulated processing parameter, and recording the simulated processing data during the simulated processing.

The CNC simulation software is software that simulates the CNC processing processes. The CNC simulation software simulates the CNC processing process, such as a movement of the CNC processing device, the tool route, and a processing state of the parts to be processed, etc., to visually display details of the CNC processing without actually processing. An exemplary CNC simulation software includes VNUC, VERICUT, SolidCAM, etc. The industrial IoT management platform simulates the CNC processing process under the simulated processing parameter based on the CNC simulation software, and records the simulated processing data.

In S223, determining whether a simulated processing part complies the processing drawing information, and adjusting the simulated processing parameter of the simulated processing part that do not comply with the processing drawing information until the adjusted simulated processing part complies the processing drawing information; and determining the simulated processing parameter of the simulated processing part that complies with the processing drawing information as the CNC processing parameter.

The simulated processing part refers to a processed target processing part which is simulated by the CNC simulation software.

In some embodiments of the present disclosure, the industrial IoT management platform compares the simulated processing part with the processing drawing information based on the size information, the processing accuracy, etc., and determines whether the simulated processing part complies with the processing drawing information. When a difference between the size information of the simulated processing part and the size information in the processing drawing information is less than the tolerance information in the processing drawing information, and the processing accuracy of the simulated processing part is not less than the processing accuracy in the processing drawing information, the industrial IoT management platform determines that the simulated processing part complies with the processing drawing information.

When the simulated processing part does not comply with the processing drawing information, the industrial IoT management platform performs an optimization adjustment the simulated processing parameter affecting the data based on data that does not comply with the processing drawing information. The optimization adjustment refers to an adjustment manner in which the data that does not comply with the processing drawing information is able to be optimized.

Exemplarily, when the processing accuracy of the simulated processing part does not comply with the processing drawing information, the industrial IoT management platform adjusts the simulated processing parameter which has an impact on the processing accuracy. For example, the industrial IoT management platform reduces the tool feed step length, selects a tool with a higher accuracy, etc.; when the simulated processing part corresponding to the adjusted simulated processing parameter complies with the processing drawing information, the industrial IoT management platform determines the adjusted simulated processing parameter as the CNC processing parameter.

In some embodiments of the present disclosure, the industrial IoT management platform generates the simulated processing parameter based on the information to be processed; generates a CNC processing program according to a programming rule based on the simulated processing parameter; simulates the CNC processing program and recording the simulated processing data; verifies the simulated processing parameter based on the simulated processing data; and determines the CNC processing parameter and the simulated processing data corresponding to the CNC processing parameter based on a verification result of the simulated processing parameter.

Descriptions of the simulated processing parameter and their generation may be found in operation S221 of FIG. 2.

The programming rule refers to a rule of a programming language. For example, the programming rule includes an assembly language, a C language, etc. In some embodiments of the present disclosure, the programming rule is determined based on the device information. For example, the industrial IoT management platform determines a program language that the CNC processing device is able to run as the programming rule.

The CNC processing program refers to a program that controls the CNC processing device to perform processing. The industrial IoT management platform generates the CNC processing program corresponding to the simulated processing parameter based on the simulated processing parameter and in accordance with the programming rule.

The simulation refers to a process of running the CNC processing program.

In some embodiments of the present disclosure, the industrial IoT management platform records data during a simulated run of the CNC processing program as the simulated processing data.

In some embodiments of the present disclosure, the industrial IoT management platform verifies the simulated processing parameter based on the simulated processing data through multiple manners.

In some embodiments of the present disclosure, the industrial IoT management platform determines, based on the simulated processing data, whether there is a collision between the tool and the parts to be processed, combines the above determination with the determinations of whether the processing accuracy of the simulated processing part exceeds a processing capability of the tool and whether the rotation speed exceeds the processing capability of the CNC processing device, and further determines whether the simulated processing parameter is reasonable.

The simulated processing parameter being reasonable means that the simulated processing parameter is run reasonably. When a simulated coordinate position of the tool in the simulated processing data overlaps with a coordinate position of the parts to be processed, the industrial IoT management platform determines that there is a collision between the tool and the parts to be processed. When the processing accuracy of the simulated processing part is greater than a maximum processing accuracy of the tool, the industrial IoT management platform determines that the processing accuracy of the simulated processing part exceeds the processing capability of the tool. When the rotation speed is greater than a maximum rotation speed of the CNC processing device, the industrial IoT management platform determines that the rotation speed exceeds the processing capacity of the CNC processing device.

When there is no collision between the tool and the parts to be processed, the processing accuracy of the simulated processing part does not exceed the processing capability of the tool, and the rotation speed does not exceed the processing capability of the CNC processing device, the industrial IoT management platform determines that the simulated processing parameter is reasonable; otherwise, the industrial IoT management platform determines that the simulated processing parameter is unreasonable.

In some embodiments of the present disclosure, the industrial IoT management platform determines, based on the simulated processing data, the simulated processing part after processing based on the simulated processing parameter; determines whether the simulated processing part complies with the processing drawing information; and thus determines whether the simulated processing parameter is accurate. The simulated processing parameter being accurate means that the simulated processing part based on the simulated processing parameter complies with the processing drawing information. When the simulated processing part complies with the processing drawing information, the industrial IoT management platform determines that the simulated processing parameter is accurate; when the simulated processing part does not comply with the processing drawing information, the industrial IoT management platform determines that the simulated processing parameter is inaccurate. Further descriptions of the simulated processing part and whether the simulated processing part complies with the processing drawing information may be found in the relevant description of operation S223.

In some embodiments of the present disclosure, the industrial IoT management platform determines the CNC processing parameter and the simulated processing data corresponding to the CNC processing parameter based on the verification result of the simulated processing parameter. The industrial IoT management platform directly determines the simulated processing parameter that passes the verification as the CNC processing parameter and determines the simulated processing data that is recorded in a process of simulation with the simulated processing parameter as the simulated processing data corresponding to the CNC processing parameter.

When the simulated processing parameter does not pass the verification, that is, when the simulated processing parameter is unreasonable and/or inaccurate, the industrial IoT management platform may adjust the simulated processing parameter until the adjusted simulated processing parameter passes the verification; then, the adjusted simulated processing parameter is determined as the CNC processing parameter.

When the simulated processing parameter is unreasonable, the industrial IoT management platform adjusts the specific parameter that is unreasonable. Exemplarily, when there is a collision between the tool and the parts to be processed, the industrial IoT management platform adjusts the tool route so that the tool avoids the portion that is colliding with the parts to be processed; when the processing accuracy of the simulated processing part exceeds the processing capability of the tool, the industrial IoT management platform replaces the tool with a tool that has a higher accuracy; and when the rotation speed exceeds the processing capacity of the CNC processing device, the industrial IoT management platform reduces the rotation speed of the CNC processing device.

When the simulated processing parameter is inaccurate, the industrial IoT management platform finds out a position where a difference between the size information in the simulated processing part and the size information in the processing drawing information is less than the tolerance information, and takes a processing progress before processing the position as the current processing progress to input to the adjustment model to obtain the adjusted simulated processing parameter. For more information about the adjustment model, please refer to the descriptions later in FIG. 2.

In some embodiments of the present disclosure, by determining the CNC processing parameter through the verification result of the simulated processing parameter, various factors, such as a device capability, and the information related to the simulated processing part, are combined to apply reasonable and accurate CNC processing parameter to the CNC processing process. In this way, a production efficiency is improved while ensuring a processing quality.

In some embodiments of the present disclosure, in response to that an estimated comprehensive deviation exceeds a first level deviation threshold, the industrial IoT management platform determines a candidate processing parameter through an adjustment model based on the estimated comprehensive deviation, the first level deviation threshold, a current processing parameter, and a current processing progress; verifies the candidate processing parameter; and determines the CNC processing parameter for a sub-route of the tool route based on a verification result of the candidate processing parameter.

The estimated comprehensive deviation refers to a size deviation of the target processing part due to a deformation of the parts to be processed as well as a position deviation of the tool in a future processing process. Determination of the estimated comprehensive deviation may be found in FIG. 5 and its related descriptions.

The first level deviation threshold refers to a preset threshold related to a deviation situation of the target processing part. More about the first level deviation threshold may be found in FIG. 5 and its related descriptions.

The current processing parameter refers to the CNC processing parameter that is currently used to perform the CNC processing. In some embodiments, the industrial IoT management platform obtains the current processing parameter from a data center.

The current processing progress refers to a current progress of the CNC processing process. In some embodiments, the industrial IoT management platform determines a ratio of a current completed route length of the tool to a length of the tool route as the current processing progress. The industrial IoT management platform determines the length of the currently completed route of the tool based on a distance traveled from an actual coordinate position of the tool in the monitoring device, and determines the length of the tool route based on the aforementioned first preset rule.

The adjustment model refers to a model used to determine the candidate processing parameter. In some embodiments, the adjustment model is a machine learning model, for example, the adjustment model is a deep neural network model, etc. The candidate processing parameter refers to an adjusted CNC processing parameter that is applied to subsequent processing process.

In some embodiments, inputs of the adjustment model include the estimated comprehensive deviation, the first level deviation threshold, the current processing parameter, and the current processing progress. Outputs of the adjustment model include a candidate CNC processing parameter for a subsequent sub-route of the CNC processing process. Further descriptions of the sub-route may be found in the related description of FIG. 3.

In some embodiments, the adjustment model is obtained by training based on first training samples with first labels. For example, a plurality of first training samples with the first labels are input to an initial adjustment model, a loss function is constructed from the first labels and results of the initial adjustment model, and parameters of the initial adjustment model are iteratively updated by a gradient descent or other manners based on the loss function. The model training is completed when a preset iteration condition is satisfied, and the trained adjustment model is obtained. The preset iteration condition is that the loss function converges or stabilizes, etc.

The first labels and the first training samples are obtained based on a historical parameter adjustment record. The first training samples include, in the historical parameter adjustment record, the CNC processing parameter before the adjustment, the estimated comprehensive deviation, the first level deviation threshold, and the processing progress when making the adjustment. The first labels include the adjusted CNC processing parameter corresponding to the first training samples in the historical parameter adjustment record. The historical parameter adjustment record is constructed based on historical data.

The verification of the candidate processing parameter is the same as the verification of the simulated processing parameter, which is seen in the relevant descriptions in the previous section of FIG. 2.

In some embodiments, the industrial IoT management platform determines the CNC processing parameter for the sub-route of the tool route based on the verification result of the candidate processing parameter.

The industrial IoT management platform directly determines verified candidate processing parameter as the CNC processing parameter for the sub-route.

When the candidate processing parameter fails to pass the verification, the industrial IoT management platform adjusts the candidate processing parameter until the adjusted candidate processing parameter passes the verification, and the adjusted candidate processing parameter is determined to be the CNC processing parameter. The adjustment of the candidate processing parameter is similar to the adjustment of the simulated processing parameter, and the relevant content may be found in the relevant descriptions in the previous section of FIG. 2.

In some embodiments, by the adjustment model, the CNC processing parameter is adjusted in a timely manner when the estimated comprehensive deviation exceeds the first level deviation threshold, so as to effectively avoid an influence of deviations generated by the future processing process of the parts to be processed, and contributes to an improvement of the processing quality.

In 230, controlling a CNC processing device of the perception control platform to perform the task to be processed based on the CNC processing parameter.

In some embodiments, the industrial IoT management platform interacts with the perception control platform based on the sensor network platform to control the CNC processing device to perform the task to be processed with the CNC processing parameter. More about the sensor network platform and the perception control platform may be found in FIG. 1 and its related descriptions.

In 240, collecting actual processing data during a performance of the task to be processed according to a monitoring frequency by a monitoring device of the perception control platform.

More about the monitoring device may be found in FIG. 1 and its associated descriptions.

The monitoring frequency refers to a frequency at which the monitoring device collects the actual processing data.

In some embodiments, the monitoring frequency is obtained in various manners. Exemplarily, the higher the rotation speed of the CNC processing device, the greater the corresponding monitoring frequency.

Figure 3:
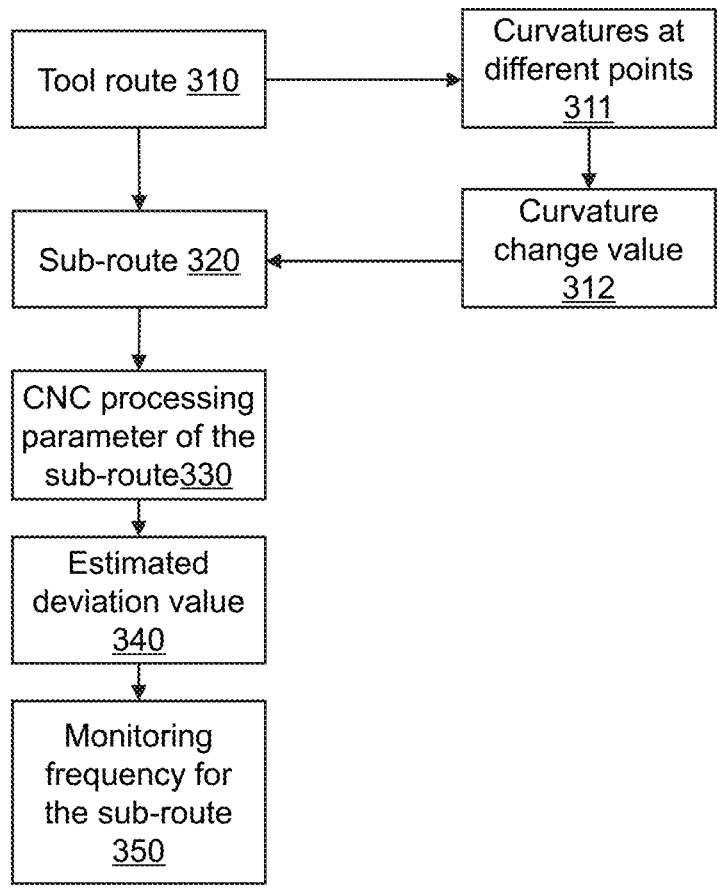
FIG. 3 is a schematic diagram illustrating an exemplary process for determining a monitoring frequency of sub-routes in a tool route according to some embodiments of the present disclosure.

In some embodiments, the industrial IoT management platform determines the monitoring frequency corresponding to the sub-route based on the estimated deviation value of the sub-route, more contents may be seen in FIG. 3 and its related descriptions.

The actual processing data refers to data related to an actual processing process of the CNC processing device. In some embodiments, the actual processing data includes the actual coordinate position of the tool and an actual cutting force of the tool.

In some embodiments, the industrial IoT management platform collects the actual processing data according to the monitoring frequency through the monitoring device of the perception control platform. For example, the industrial IoT management platform obtains the actual coordinate position of the tool via a three-bit HD camera, a motion sensor, etc.; and obtains the actual cutting force of the tool via the pressure sensor, etc. For example, the industrial IoT management platform determines a difference between the obtained pressure data and the pressure data in an initial state as the actual cutting force of the tool.

In 250, performing a deviation determination on the actual processing data and the simulated processing data.

The deviation determination refers to a process of determining a difference between the actual processing data and the simulated processing data. Results of the deviation determination include the position deviation of the tool and a cutting force deviation of the tool. The results of the deviation determination are used to determine whether to generate a processing alert instruction. Further description of the processing alert instruction may be found in the related description of operation 260.

In some embodiments, the industrial IoT management platform determines the position deviation of the tool based on the difference between the actual coordinate position and the simulated coordinate position; and determines the cutting force deviation of the tool based on the difference between the actual cutting force and the simulated cutting force.

In 260, in response to that a result of the deviation determination satisfies a preset alert condition, generating a processing alert instruction and sending the processing alert instruction to an alert device of a user platform.

The preset alert condition is a preset condition for determining whether or not to generate the processing alert instruction. The preset alert condition is set by the system or by a human being. Exemplarily, the preset alert condition includes: the position deviation exceeding a preset distance threshold and/or the cutting force deviation exceeding a preset force difference threshold. The preset distance threshold and the preset force difference threshold are preset based on experience. The preset distance threshold is less than the tolerance information of the target processing part in order to make timely adjustments before the parts to be processed is scrapped, thereby reducing losses. For example, the preset distance threshold is 60% of the tolerance information of the target processing part, etc.

The processing alert instruction refers to an instruction for alerting on the CNC processing. In some embodiments, the processing alert instruction includes the position deviation and/or the cutting force deviation, the current processing progress, and an alert manner. Further description of the current processing progress may be found in the related description in FIG. 2 above.

The alert manner refers to a manner in which the alert device conducts the alert. For example, the alert manner includes highlighting, voice alerting, etc.

When the result of the deviation determination satisfies the preset alert condition, the industrial IoT management platform automatically generates the processing alert instruction based on the result of the deviation determination. Exemplarily, when the processing progress is 20%, the result of the deviation determination is a position deviation of 2 mm, which exceeds the preset distance threshold, and the industrial IoT management platform generates the following processing alert instruction: the position deviation value of the toll at a current processing position is 2 mm, the current processing progress is 20%, please alert with a voice warning.

In some embodiments, the industrial IoT management platform interacts with the user platform based on the service platform to send the processing alert instruction to the alert device. Further description of the service platform, the user platform, and the alert device may be found in FIG. 1 and its related description.

In 270, controlling the CNC processing device to adjust the tool feed step length based on the actual processing data.

In some embodiments, the industrial IoT management platform controls the CNC processing device to adjust the tool feed step length based on the actual processing data in various ways.

In some embodiments, the industrial IoT management platform determines the position deviation based on the actual processing data, and adjusts the tool feed step length based on the position deviation. For example, when the position deviation is 0.5 mm, the industrial IoT management platform reduces the tool feed step length by 0.5 mm.

In some embodiments of the present disclosure, a CNC process simulation is performed based on the information to be processed, the CNC processing parameter and the simulated processing data corresponding to the CNC processing parameter are determined, and the actual processing data during the actual processing is collected, and the processing alert instruction is generated and the tool feed step length is adjusted based on the results of the deviation determination. In this way, a comprehensive and intelligent monitoring of the CNC processing process is allowed, and when the position deviation or the cutting force deviation does not satisfy the requirement, an alert is issued and the feed step length is adjusted, which ensures the processing quality, reduces a production cost, and enhances a flexibility and applicability of the CNC processing.

In some embodiments, the industrial IoT management platform generates a 3D model of a product based on the actual processing data; extracts measurement data of the 3D model; and determines the processing quality of the product based on the measurement data and product size data.

The 3D model of the product is a 3D model of the target processing part. In some embodiments, the industrial IoT management platform determines actual sizes of different positions of the target processing part based on a plurality of actual coordinate positions of the tool collected by the monitoring device; and reconstructs the parts to be processed based on the actual sizes of the different positions to obtain a 3D model of the product.

The measurement data refers to size data of different positions of the target processing part produced by CNC processing. The measurement data is extracted directly by the system.

The product size data refers to the target size information of the target processing part in the processing drawing information. The industrial IoT management platform obtains the product size data based on the processing drawing information.

The product processing quality is a quality of the target processing part for the CNC processing. The product processing quality is divided into qualified and unqualified products, and is also classified as excellent, good, medium, and poor.

In some embodiments, the industrial IoT management platform determines the product processing quality in various manners based on the measurement data and the product size data. For example, the industrial IoT management platform determines the product processing quality according to a second preset rule based on a difference between the measurement data and the product size data. The second preset rule refers to a preset rule for determining the product processing quality. For example, the second preset rule includes a correspondence between the difference between the measurement data and the product size data and the product processing quality. The second preset rule is determined by an expert.

An exemplary correspondence is the smaller the difference between the measurement data and the product size data, the higher the product processing quality. Optionally, the exemplary correspondence is: when the difference between the measurement data and the product size data exceeds a size difference threshold, the product is determined to be an unqualified product, otherwise, the product is determined to be a qualified product; the size difference threshold is preset by the system or by a human.

In some embodiments of the present disclosure, the product processing quality is determined through the measurement data of the 3D model of the product and the product size data, which is used to intuitively and accurately determine the quality of the product processing, so as to improve a level of intelligence of CNC processing.

FIG. 3 is a schematic diagram illustrating an exemplary process for determining a monitoring frequency of sub-routes in a tool route according to some embodiments of the present disclosure.

In some embodiments, the monitoring frequency includes a monitoring frequency of the sub-route in the tool route. The industrial IoT management platform divides a tool route 310 to determine sub-routes 320; determines, based on a CNC processing parameter 330 of the sub-routes, estimated deviation values 340 corresponding to the sub-routes; and determines a monitoring frequency 350 for the sub-routes based on the estimated deviation values 340. Related descriptions of the tool route, the CNC processing parameter, and the monitoring frequency are seen in FIG. 2 and its description.

The sub-routes are a plurality of routes obtained by dividing the tool route.

In some embodiments, the industrial IoT management platform divides the tool route in various manners to determine the sub-routes.

In some embodiments, the industrial IoT management platform divides the tool route based on segment points, and determines a route between two adjacent segment points in the tool route as the sub-route.

The segment points are a plurality of points at which the tool route is segmented. In some embodiments, the segment points between sub-routes include points where an implement needs to be switched during the CNC processing process on the tool route. The implements include tools, gauges, fixtures, etc., and more description may be found in the related description of operation 220 in FIG. 2.

In some embodiments, the industrial IoT management platform determines curvatures at different points 311 on the tool route; determines a curvature change value 312 of two adjacent points; and clusters the points based on the curvature change value 312 to determine the sub-route 320.

The points refer to the positions of the plurality of points that make up the tool route.

In some embodiments, the industrial IoT management platform calculates curvatures at different points by a curvature formula.

The curvature change value refers to a value of change in curvature between two adjacent points. In some embodiments, the industrial IoT management platform calculates a difference in curvature for two adjacent points and determines the difference as the curvature change value for the two adjacent points.

In some embodiments, by clustering the points, the industrial IoT management platform determines the sub-route based on the curvature change value. Exemplary clustering manners include K-means clustering, hierarchical clustering, etc. Exemplarily, the clustering process includes the following operations S31-S33:

In S31, determining a count of clustering centers (i.e., a K value) based on a total length of the tool route.

In some embodiments, the K-value is positively correlated with the total length of the tool route. The longer the total length of the tool route, the greater the K value.

In S32, through the K-means clustering, obtaining K counts of clusters by clustering, based on the curvature change value, the plurality of points on the tool route. Each of the clusters includes a plurality of positions that are continuous or discontinuous in position.

In S33, determining a route corresponding to the plurality of points that are continuous in position in each cluster as one sub-route.

The greater the curvature change value, the more complex the tool route; in some embodiments of the present disclosure, by dividing the sub-routes based on the curvature change value, it is ensured that the curvature at each point in each sub-route is similar to each other, thereby enabling the monitoring device to monitor the processing process more accurately.

The CNC processing parameter of the sub-route includes the corresponding CNC processing parameter of the sub-route. For example, the implements used for the sub-route, the processing sequence, the tool feed step length, etc. In some embodiments, the industrial IoT management platform obtains the CNC processing parameter of the sub-route based on the segmented sub-routes and the CNC processing parameter corresponding to the CNC processing process.

The estimated deviation value of the sub-route refers to estimated maximum processing deviation value when processing the sub-route. In some embodiments, the industrial IoT management platform determines, based on the CNC processing parameter of the sub-routes, the estimated deviation values corresponding to the sub-routes in various manners. For example, the industrial IoT management platform determines, based on historical data, the maximum deviation value when processing the same sub-route in history with the same CNC processing parameters as the estimated deviation value.

Figure 4:
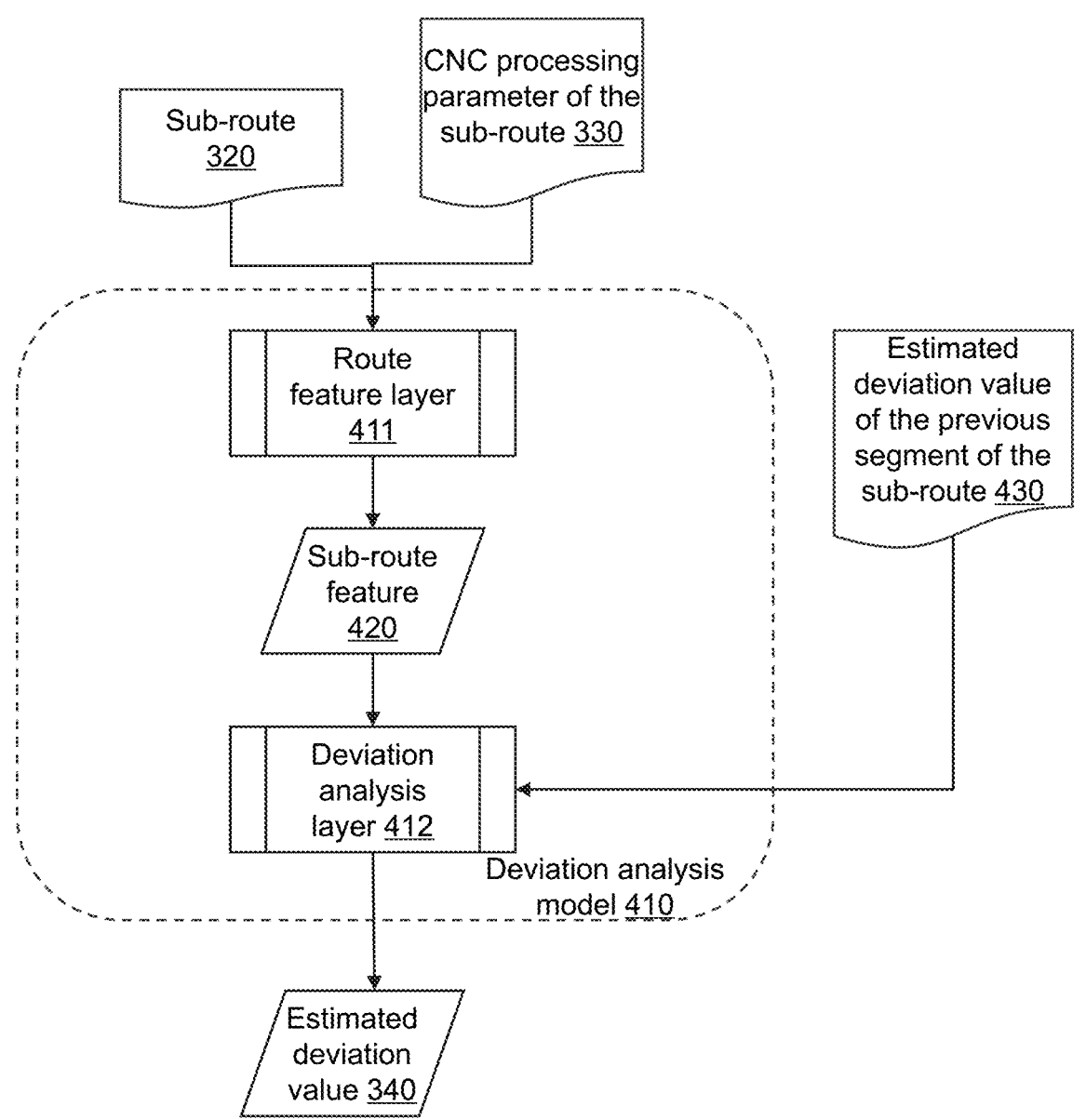
FIG. 4 is a schematic diagram illustrating an exemplary deviation analysis model according to some embodiments of the present disclosure.

In some embodiments, the industrial IoT management platform determines the estimated deviation value based on a deviation analysis model, and more contents is seen in FIG. 4 and its related description.

In some embodiments, the industrial IoT management platform determines the monitoring frequency of the sub-route in various manners based on the estimated deviation value. Exemplarily, the closer the estimated deviation value of the sub-route is to tolerance information corresponding to the target processing part, the higher the monitoring frequency of the sub-route. In some embodiments, when the estimated deviation value of the sub-route is not less than the tolerance information, the industrial IoT management platform adjusts the monitoring frequency of the sub-route up to the maximum monitoring frequency value that is achieved by the monitoring device.

In some embodiments, the industrial IoT management platform dynamically adjusts the monitoring frequency of the sub-route based on a difference between an estimated comprehensive deviation and a first level deviation threshold.

Figure 5:
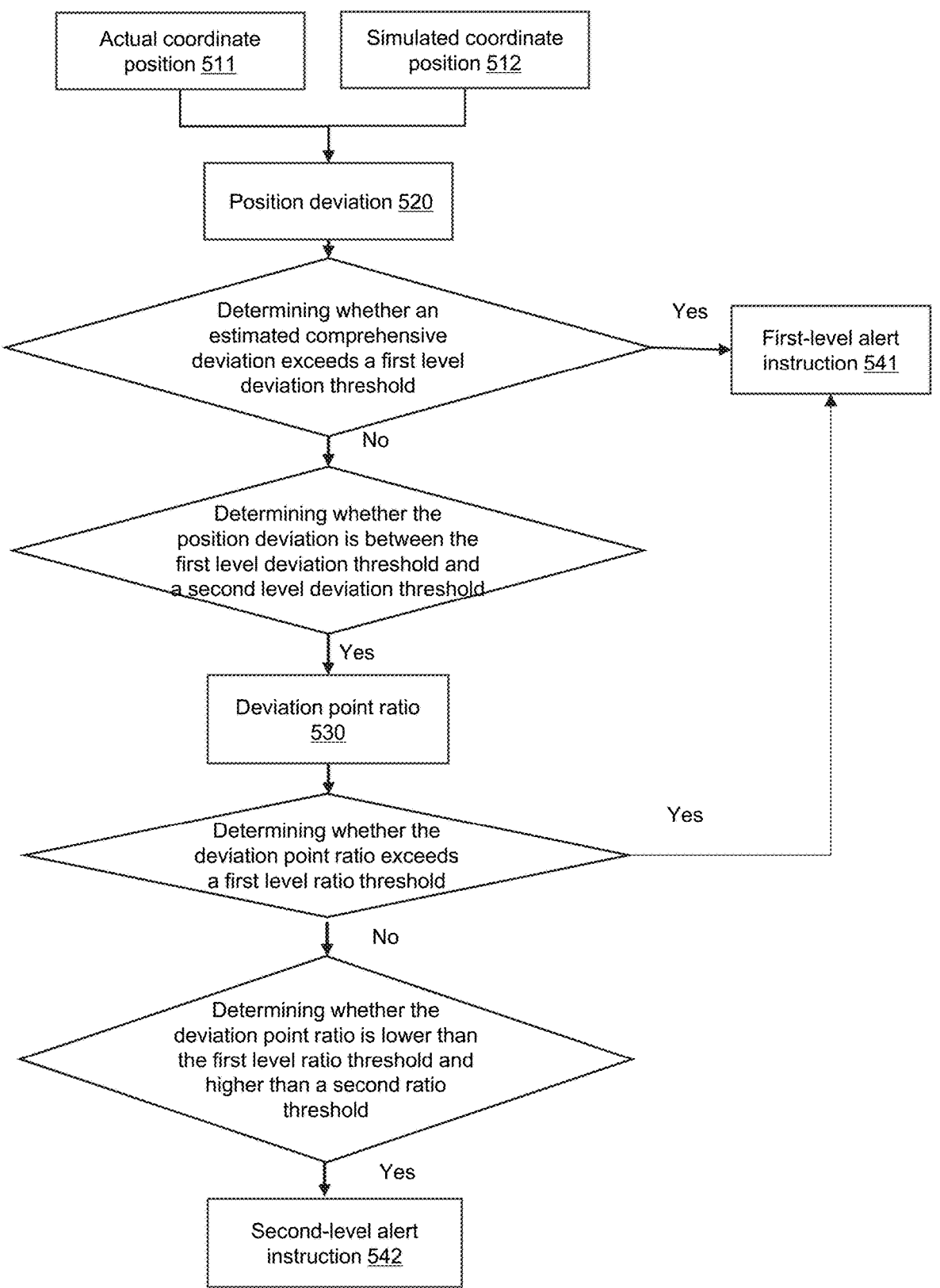
FIG. 5 is a schematic diagram illustrating a process for generating a processing alert instruction according to some embodiments of the present disclosure.

More information about the estimated comprehensive deviation and the first level deviation threshold may be found in descriptions in FIG. 2 and FIG. 5.

In some embodiments, the industrial IoT management platform adjusts the monitoring frequency of the sub-route in various manners based on the difference between the estimated comprehensive deviation and the first level deviation threshold.

In some embodiments, when the estimated comprehensive deviation does not exceed the first level deviation threshold, the smaller the difference between the estimated comprehensive deviation and the first level deviation threshold, the higher the monitoring frequency of the sub-route. When the estimated comprehensive deviation reaches or exceeds the first level deviation threshold, the industrial IoT management platform adjusts the monitoring frequency of the sub-route to the maximum monitoring frequency value that is achieved by the monitoring device. In some embodiments, the industrial IoT management platform dynamically obtains the estimated comprehensive deviation and dynamically adjust the adjustment frequency of the sub-route based on the difference between the estimated comprehensive deviation and the first level deviation threshold.

In some embodiments of the present disclosure, by dynamically adjusting the monitoring frequency through the difference between the estimated deviation value and the first level deviation threshold, a flexibility of monitoring the sub-route is improved, and the CNC processing is improved while ensuring a comprehensive monitoring of the CNC processing process.

In some embodiments of the present disclosure, by dividing the sub-route and determining the monitoring frequency of the sub-route based on the estimated deviation value of the sub-route, the intelligent monitoring of the CNC processing process is realized, and the accuracy and flexibility of the monitoring is improved.

FIG. 4 is a schematic diagram illustrating an exemplary deviation analysis model according to some embodiments of the present disclosure.

In some embodiments, through a deviation analysis model 410, an industrial IoT management platform determines the estimated deviation value 340 based on the CNC processing parameter 330 of the sub-route. More about a CNC processing parameter of the sub-route, and the estimated deviation value are found in the relevant descriptions in FIG. 3.

The deviation analysis model 410 refers to a model used to determine the estimated deviation value of the sub-route. In some embodiments, the deviation analysis model is a machine learning model. For example, the deviation analysis model is one of the convolutional neural networks (CNN) model, deep neural networks (DNN) model, etc. or any combination thereof.

In some embodiments, the deviation analysis model 410 includes a route feature layer 411 and a deviation analysis layer 412.

The route feature layer refers to a model for determining sub-route features. In some embodiments, the route feature layer is a machine learning model. For example, the route feature layer is a CNN model.

In some embodiments, inputs to the route feature layer includes the sub-route 320 and the CNC processing parameter 330 of the sub-route, and outputs of the route feature layer includes a sub-route feature 420.

The sub-route feature refers to a feature associated with the sub-route. For example, the sub-route feature includes a sub-route length, a curvature change value corresponding to the sub-route, etc.

The deviation analysis layer refers to a model for determining the estimated deviation value. In some embodiments, the deviation analysis layer is a machine learning model. For example, the deviation analysis layer is a DNN model.

In some embodiments, inputs of the deviation analysis layer 412 includes the sub-route feature 420, the estimated deviation value 430 of the previous segment of the sub-route, and an output of the deviation analysis layer 412 includes the estimated deviation value 340 corresponding to the sub-route.

The previous sub-route refers to a previous sub-route of the current sub-route. It may be understood that the estimated deviation value of the previous sub-route affects the estimated deviation value of the current sub-route, therefore, when determining the estimated deviation value of the current sub-route, an analysis of the estimated deviation value of the previous sub-route is required.

In some embodiments, the industrial IoT management platform stores the estimated deviation value for each sub-route determined based on the deviation analysis model to a data center, and obtains, through the data center, the estimated deviation value of the previous segment of sub-route of the sub-route. For the first sub-route, the estimated deviation value of the previous segment of the sub-route entered to the deviation analysis layer is set to a null or an invalid value.

In some embodiments, the deviation analysis model is obtained by jointly training the route feature layer and the deviation analysis layer.

In some embodiments, the industrial IoT management platform trains the route feature layer 411 and the deviation analysis layer 412 based on a training dataset to obtain the deviation analysis model 410. The training dataset includes second training samples with second labels. Each of the second training samples includes a sample sub-route, a CNC processing parameter corresponding to the sample sub-route, and an actual deviation value of the previous segment of the sub-route of the sample sub-route. Each of the second labels includes an actual deviation value corresponding to the sample sub-route. The second training samples and the second labels are obtained based on historical data.

An exemplary joint training process includes: inputting the sample sub-route and the CNC processing parameter corresponding to the sample sub-route into an initial route feature layer to obtain the sub-route feature output from the initial route feature layer; inputting the sub-route feature output from the initial route feature layer and the actual deviation value of the previous sub-route of the sample sub-route into the initial deviation analysis layer, and the estimated deviation value output from the initial deviation analysis layer is obtained. A loss function is constructed based on the second labels and the estimated deviation value output from the initial deviation analysis layer, inversely updating the model parameters of the initial route feature layer and the initial deviation analysis layer based on the loss function until the trained model satisfies a preset training condition and a trained model is obtained. The preset training condition is that the loss function is less than a threshold, converges, or the training period reaches a threshold. In some embodiments, a method of updating the model parameters includes a model training method such as a stochastic gradient descent.

In some embodiments, the industrial IoT management platform obtains a comprehensive deviation during the processing process; determines, based on the comprehensive deviation, a confidence level of a training label (the second label) corresponding to the deviation analysis model in the current CNC processing; updates, based on the confidence level, a training dataset corresponding to the deviation analysis model; and, performs, based on an updated training dataset, an updating training of the deviation analysis model.

The comprehensive deviation refers to a size deviation of the target processing part due to a combination of the deformation of the parts to be processed and the position deviation of the tool in the processing of the sub-route. More about the determination of the comprehensive deviation may be found in FIG. 5 and the related descriptions.

The confidence level refers to a level of confidence in the second label of the deviation analysis model. In some embodiments, the industrial IoT management platform determines the confidence level by the following operations S41-S44:

In S41, obtaining curvatures of different points in the sub-route corresponding to the comprehensive deviation, and constructing a sub-route curvature vector. In some embodiments, for each sub-route processed, the industrial IoT management platform determines the comprehensive deviation of a workpiece after processing the sub-route. The sub-route curvature vector refers to a vector constructed from curvatures at different points in the sub-route corresponding to the comprehensive deviation.

In S42, calculating the curvatures of different points of the sample sub-route in each second training sample in the training dataset, and constructing a sample sub-route curvature vector.

In S43, determining a similarity between the sub-route curvature vector and the sample sub-route curvature vector, and determining the sample sub-route with the similarity higher than a similarity threshold as a target sample sub-route.

The industrial IoT management platform determines the similarity between the sub-route curvature vector and the sample sub-route curvature vector based on various feasible similarity algorithms, such as a Euclidean distance, a cosine similarity, etc. The similarity threshold is manually preset based on experience or an actual situation. The target sample sub-route refers to the sample sub-route that needs to be updated with the corresponding training label.

In S44, determining the confidence level.

In some embodiments, the industrial IoT management platform determines the confidence level based on a count of target sample sub-routes in the second label that have an actual deviation value greater than the comprehensive deviation.

Exemplarily, the greater the count of target sample sub-routes in the second label whose actual deviation values are greater than the comprehensive deviation, the higher the confidence level of the corresponding second label. Exemplarily, the confidence level of the second label is determined based on the formula: confidence level of the second label=count of target sample sub-routes in the second label whose actual error values are greater than the comprehensive deviation÷a total count of target sample sub-routes.

In some embodiments, the industrial IoT management platform updates the training dataset corresponding to the deviation analysis model based on the confidence level in various ways. For example, the industrial IoT management platform replaces the actual deviation value of the second label corresponding to the target sample sub-route in the training dataset with the comprehensive deviation when the confidence level of the second label is less than a confidence threshold. The confidence threshold is manually preset based on the experience or the actual situation.

In some embodiments, the industrial IoT management platform updates the training of the deviation analysis model based on the updated training dataset. It is appreciated that when the estimated deviation value of the deviation analysis model is inaccurate, the updating training of the deviation analysis model is required, and the estimated deviation value is predicted again using the updated trained deviation analysis model. When the monitoring frequency determined based on the estimated deviation value is unreasonable (e.g., a difference between the monitoring frequency and a historical average monitoring frequency exceeds a frequency difference threshold, etc.), the industrial IoT management platform determines that the estimated deviation value predicted by the deviation analysis model is inaccurate. The frequency difference threshold is preset manually or by the system. The historical average monitoring frequency is obtained based on statistics of the historical data.

When the industrial IoT management platform predicts the estimated deviation value again using the deviation analysis model after the updating training, the estimated deviation value of the previous sub-route segment entered by the deviation analysis layer is the actual deviation value of the previous sub-route segment of the current process.

In some embodiments of the present disclosure, by evaluating the confidence level of the training label based on the comprehensive deviation value during the processing process and updating the training dataset of the deviation analysis model by the confidence level, and thus updating the training deviation analysis model, a prediction accuracy of the deviation analysis model is improved, which in turn improves a productivity and a processing quality.

In some embodiments of the present disclosure, by predicting the estimated deviation value of the sub-route by the deviation analysis model, a self-learning capability of the machine learning model is utilized to find patterns in a great amount of data, which helps to quickly and accurately determine the monitoring frequency of the sub-route.

FIG. 5 is a schematic diagram illustrating a process for generating a processing alert instruction according to some embodiments of the present disclosure.

In some embodiments, a deviation determination includes a single-point deviation determination and a multi-point deviation determination, and the processing alert instruction includes a first-level alert instruction 541 and a second-level alert instruction 542.

The first-level alert instruction refers to an instruction that makes an alert device to issue a first level alert.

The second-level alert instruction refers to an instruction that makes the alert device to issue a second level alert.

An alert level of the first level alert is higher than the alert level the second level alert. When the alert device issues the first level alert, it indicates that a target processing part has a higher risk of being unqualified; when the alert device issues the second level alert, it indicates that the target processing part has a certain risk of being unqualified.

The single-point deviation determination refers to a determination of a position deviation of a single processing position. In some embodiments, the single-point deviation determination includes that in response to that a position deviation 520 of the tool exceeds a first level deviation threshold, determining a position abnormity of the tool and generating the first-level alert instruction.

The position deviation refers to a deviation between an actual coordinate position 511 of the tool and a corresponding simulated coordinate position 512. The industrial IoT management platform determines a coordinate distance between the actual coordinate position and the corresponding simulated coordinate position as the position deviation. Further description of the actual coordinate position, the simulated coordinate position, and the first level deviation threshold may be found in FIG. 2 and the related descriptions.

In some embodiments, the first level deviation threshold is preset by a technician. It is noted that the first level deviation threshold is less than tolerance information of the target processing part. For example, the first level deviation threshold is 80% of the tolerance information of the target processing part, etc.

In some embodiments, the industrial IoT management platform determines, based on the information to be processed, a historical processing task with a highest similarity to the task to be processed retrieved from historical data as a reference processing task; determines the first level deviation threshold based on a statistical value of historical deformation data during a historical processing process of the parts to be processed in the reference processing task as well as the tolerance information of the target processing part. The historical deformation data refers to a deformation data of the parts to be processed in the reference processing task during the historical processing process, which is obtained based on the historical data.

Further description of the deformation data may be found later in FIG. 5. The statistical value of the historical deformation data includes a mean, a variance, etc. of the historical deformation data. The greater the statistical value of the historical deformation data, the smaller the corresponding first level deviation threshold.

Exemplarily, the first level deviation threshold is determined by the following equation: first level deviation threshold=tolerance information−(mean of historical deformation data+variance of historical deformation data).

In some embodiments, the industrial IoT management platform determines the position abnormity of the tool and generates the first-level alert instruction when the position deviation exceeds the first level deviation threshold. For example, when the position deviation is 2 mm and the first level deviation threshold is 1 mm, the industrial IoT management platform generates a first level alert instruction: "The position of the tool is abnormal, and there is a high risk for the target processing part to be unqualified, please issue a first level alert: highlighting the position deviation of 1 mm in red, and performing a voice reminder at maximum volume for three times".

In some embodiments, the industrial IoT management platform obtains a pressure data sequence based on a pressure sensor of a perception control platform; determines the deformation data for the parts to be processed based on the pressure data sequence; determines a comprehensive deviation based on the deformation data and the position deviation; and in response to that the comprehensive deviation exceeds the first level deviation threshold, determines that the processing deviation is abnormal and generates the first-level alert instruction. More descriptions of the perception control platform and the pressure sensor may be found in FIG. 1 and the descriptions.

The pressure data sequence refers to a sequence of a plurality of pressure data. In some embodiments, the industrial IoT management platform constructs the pressure data sequence from the plurality of pressure data in a process of the tool cutting for a single round.

The deformation data refers to data related to the deformation of the parts to be processed. For example, the deformation data includes values of deformation of the parts to be processed in different directions.

In some embodiments, the industrial IoT management platform determines the deformation data for the parts to be processed in various manners based on the pressure data sequence.

In some embodiments, the industrial IoT management platform determines a difference in the pressure data between two corresponding directions in the pressure data sequence and determines the deformation data of the parts to be processed in the directions based on the difference of the pressure data. The corresponding directions are directions in which the parts to be processed are located at both ends of a same diameter. For example, a 90° direction and a 270° direction of a cross-section of the parts to be processed are the corresponding directions. The difference between the degrees corresponding to the two corresponding directions is 180°.

In some embodiments, the industrial IoT management platform determines a sum of a ratio of a pressure data change value to an initial value of the pressure data and the diameter of a current cross-section as the deformation data in the direction. The deformation direction refers to a direction in which the pressure data is greater. The initial value of the pressure data refers to a pressure value of the tool cutting the parts to be processed when no deformation occurs. The industrial IoT management platform determines a mean of all pressures in the pressure data sequence as the pressure data initial value. The pressure data change value refers to a change value of the pressure data of the tool cutting the parts to be processed relative to the pressure data initial value. The industrial IoT management platform determines a half of the difference between the pressure data in the two corresponding directions in the pressure data sequence as the corresponding pressure data change value.

The comprehensive deviation refers to a size deviation of the target processing part caused by a combination of the deformation of the parts to be processed and the position deviation of the tool when processing a sub-route. In some embodiments, the industrial IoT management platform determines the comprehensive deviation based on the deformation data, the position deviation according to geometric law.

Exemplarily, when a position deviation direction of the tool is in a straight line with a deformation deviation direction of the parts to be processed, and the two deviation directions are opposite to each other, the industrial IoT management platform determines a sum of the position deviation of the tool and the deformation deviation of the parts to be processed to be the comprehensive deviation; when the position deviation direction of the tool and the deformation deviation direction of the parts to be processed are in the straight line, and the two deviation directions are the same, then the industrial IoT management platform determines a difference between the position deviation of the tool and the deformation deviation of the parts to be processed as the comprehensive deviation. For example, if the position deviation of the tool is a deviation of 0.1 mm in 0° direction, and the deformation data of the parts to be processed is a deformation of 0.2 mm in 180° direction, the comprehensive deviation is 0.3 mm, and the direction of the comprehensive deviation is 180° direction. For example, if the position deviation of the tool is 0.1 mm in 90° direction, and the deformation data of the parts to be processed is 0.2 mm in 90° direction, then the comprehensive deviation is 0.1 mm, and the direction of the comprehensive deviation is 90°. When the direction of the position deviation of the tool is not in the straight line with the direction of deformation of the parts to be processed, the industrial IoT management platform determines the comprehensive deviation and the corresponding deviation direction based on Pythagorean Theorem or other geometric laws.

In some embodiments, in response to that the comprehensive deviation exceeds the first level deviation threshold, the industrial IoT management platform determines that the processing deviation is abnormal and generates the first-level alert instruction. For example, with a comprehensive deviation of 0.3 mm and the first level deviation threshold of 0.1 mm, the industrial IoT management platform generates the first-level alert instruction: "The processing deviation is abnormal and there is a high risk for the target processing part to be unqualified, please issue a first level alert: highlighting the comprehensive deviation of 0.3 mm in red, and performing the voice reminder at a maximum volume for three times".

In some embodiments of the present disclosure, by performing the single-point deviation determination based on the comprehensive deviation, the tool position and the deformation of the parts to be processed are combined to determine the abnormity of the CNC processing, which improves a comprehensive monitoring of the CNC processing, improves a processing accuracy, and improves a production efficiency.

The multi-point deviation determination refers to a determination of deviations at a plurality of continuous processing points. In some embodiments, the multi-point deviation determination includes: in response to that the position deviation is between the first level deviation threshold and a second level deviation threshold, performing a multi-level determination based on a deviation point ratio 530. The multi-level determination includes: in response to that the deviation point ratio exceeds a first level ratio threshold, determining the position abnormity of the tool and generating the first-level alert instruction; and in response to that the deviation point ratio is lower than the first level ratio threshold and higher than the second ratio threshold, determining the position abnormity of the tool and generating the second-level alert instruction.

The second level deviation threshold refers to a preset threshold associated with a deviation situation of the target processing part, and the second level deviation threshold is less than the first level deviation threshold. The second level deviation threshold is preset by the technician.

In some embodiments, the industrial IoT management platform determines the mean and the variance of processing deviations of a plurality of historical target processing parts with qualified processing quality in the reference processing task, and determines a difference between the aforementioned mean and variance as the second level deviation threshold. The determination of the reference processing task is found in the description of the preceding section of FIG. 5.

The deviation point ratio refers to a ratio of a count of processing points whose position deviations are between the first level deviation threshold and the second level deviation threshold to a total count of the processing points after the processing is started.

The first level ratio threshold and the second ratio threshold are both threshold conditions for determining whether to generate the processing alert instruction based on the deviation point ratio, and the second ratio threshold is lower than the first level ratio threshold.

In some embodiments, the industrial IoT management platform determines a mean of a ratio of a count of processing positions with the position deviation between the first level deviation threshold and the second level deviation threshold to a total count of processing positions in the unqualified products of the reference processing task, and determines the mean as the first level ratio threshold.

In some embodiments, the industrial IoT management platform determines the mean and the variance of the ratio of the count of processing positions with the position deviation between the first level deviation threshold and the second level deviation threshold to the total count of processing positions in the qualified product of the reference processing task, and determines a difference between the mean and the variance of this ratio as the second ratio threshold.

In some embodiments, in response to that the deviation point ratio is below the first level ratio threshold and above the second ratio threshold, the industrial IoT management platform determines the position abnormity of the tool and generates the second-level alert instruction. For example, the industrial IoT management platform generates the second-level alert instruction: "The position of the tool is abnormal, and there is a certain risk for the target processing part to be unqualified, please issue a second-level alert: highlighting the abnormal position of the tool in blue and performing a voice reminder in a medium volume for once".

In some embodiments of the present disclosure, by means of the single-point deviation determination and the multi-point deviation determination, the position of the tool is comprehensively determined based on one processing point position or multiple processing point positions, which improves an applicability and accuracy of the deviation determination and helps to generate more accurate processing alert instructions; by grading the processing alert instructions, staff is able to flexibly determine more applicable adjustment manners based on different levels of processing alert instructions, thereby improving the flexibility and applicability of the CNC processing.

In some embodiments of the present disclosure, the processing alert instruction further includes a warning instruction. The industrial IoT management platform obtains temperature data of a surface of the parts to be processed based on a temperature sensor; predicts future deformation data based on a temperature data sequence and the pressure data sequence; determines an estimated position deviation of the sub-route based on the estimated deviation value; determines the estimated comprehensive deviation based on the future deformation data and the estimated position deviation; and in response to that the estimated position deviation exceeds the first level deviation threshold, generates the warning instruction.

The temperature data refers to data related to the temperature of the surface of the parts to be processed. The industrial IoT management platform collects the temperature data on the surface of the parts to be processed based on the temperature sensor.

The temperature data sequence refers to a sequence composed of the temperature data during processing.

The future deformation data refers to deformation data of the parts to be processed in the next processing process. The next processing process includes an unfinished processing process in the current sub-route, and the processing process of the next sub-route.

In some embodiments, the industrial IoT management platform predicts the future deformation data based on the temperature data sequence, the pressure data sequence through multiple manners.

The industrial IoT management platform constructs a deformation prediction vector based on the temperature data sequence, the pressure data sequence, to-be-processed part information, and a CNC processing parameter; takes, based on the deformation prediction vector, a historical deformation vector with the highest similarity with the deformation prediction vector as the reference deformation vector in the deformation vector database; and determines the deformation data corresponding to the reference deformation vector and the deformation data corresponding to the next sub-route as the future deformation data. More descriptions on the to-be-processed part information and the CNC processing parameter may be found in FIG. 2 and the related descriptions.

The deformation vector database includes the historical deformation vector constructed based on a historical temperature data sequence, a historical pressure data sequence, historical to-be-processed part information, and a historical CNC processing parameter. The deformation vector database further includes the deformation data corresponding to the historical deformation vector, and the deformation data corresponding to the next sub-route. The deformation vector database is constructed based on the historical data and is stored in a data center. More descriptions about the data center may be found in FIG. 1 and the descriptions thereof.

The estimated position deviation refers to the position deviation of the tool for the next processing process. In some embodiments, the industrial IoT management platform determines the estimated position deviation based on the estimated deviation value in various manners. Related descriptions of the estimated deviation value may be found in FIG. 3 and the related descriptions.

For example, the industrial IoT management platform determines a difference between the estimated deviation value and historical average deformation data as the estimated position deviation. The historical average deformation data refers to an average of the historical deformation data corresponding to the processing of the historical sub-routes, which is obtained based on statistics of the historical data.

The estimated comprehensive deviation refers to a size deviation of the target processing part caused by the deformation of the parts to be processed as well as the position deviation of the tool in the process of the future processing sub-route. The industrial IoT management platform determines the estimated comprehensive deviation based on the future deformation data and the estimated position deviation. The manner of determining the estimated comprehensive deviation is similar to the manner of determining the comprehensive deviation, and the relevant content may be found in the relevant descriptions in the previous section of FIG. 5.

The warning instruction refers to an instruction related to an early warning of the future processing process. In some embodiments, in response to that the estimated position deviation exceeds the first level deviation threshold, the industrial IoT management platform generates the warning instruction. For example, in response to that the estimated position deviation exceeds the first level deviation threshold, the industrial IoT management platform generates a warning instruction: "The position deviation during the following processing process exceeds the first level deviation threshold, please perform an early warning".

A temperature changes a strength of the parts to be processed, which in turn affects the deformation data. In some embodiments of the present disclosure, by combining the temperature data to predict the future deformation data, and thus determining the estimated comprehensive deviation, the comprehensive deviation in the future processing process is predicted in advance, and by providing the early warning, the intelligence as well as the accuracy of CNC processing is improved.

The basic concepts have been described above, and it is apparent to those skilled in the art that the foregoing detailed disclosure serves only as an example and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the specification, such as "an embodiment," "an embodiment," and/or "some embodiment" means a feature, structure, or characteristic associated with at least one embodiment of the present disclosure. Accordingly, it should be emphasized and noted that the "one embodiment," "a count of embodiments," or "an embodiment" referred to two or more times in different positions in the present disclosure means a feature, structure, or characteristic related to at least one embodiment of the present disclosure. "An embodiment," or "an alternative embodiment" in different places in the present disclosure do not necessarily refer to the same embodiment. In addition, certain features, structures, or characteristics of one or more embodiments of the present disclosure may be suitably combined.

Additionally, unless expressly stated in the claims, the order of the processing elements and sequences described herein, the use of numerical letters, or the use of other names are not intended to qualify the order of the processes of the present disclosure and of the laminar flow hood. While some embodiments of the invention that are currently considered useful are discussed in the foregoing disclosure by way of various examples, it is to be understood that such details serve only illustrative purposes, and that additional claims are not limited to the disclosed embodiments, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the invention, the foregoing descriptions of embodiments of the present disclosure sometimes group multiple features together in a single embodiment, accompanying drawings, or in a description thereof. However, this method of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of embodiments are modified in some examples by the modifiers "approximately," "nearly," or "substantially," "approximately," or "generally" is used in some examples. Unless otherwise noted, the terms "about," "approximate," or "approximately" indicates that a ±20% variation in the stated number is allowed. Correspondingly, in some embodiments, the numerical parameters used in the specification and claims are approximations, which can change depending on the desired characteristics of individual embodiments. In some embodiments, the numerical parameters should consider the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for intelligent monitoring of computer numerical control (CNC) processing based on an industrial internet of things (IoT), implemented by an industrial IoT management platform, wherein the method comprises:

obtaining, based on an input device of a perception control platform, information corresponding to a task that will be completed;

determining a CNC processing parameter and simulated processing data corresponding to the CNC processing parameter by performing a CNC process simulation based on the information, including:

generating a simulated processing parameter based on the information;

generating a CNC processing program according to a programming rule based on the simulated processing parameter;

simulating the CNC processing program and recording the simulated processing data, wherein the simulated processing data includes simulated coordinate positions of tools;

verifying the simulated processing parameter based on the simulated processing data; and determining the CNC processing parameter and the simulated processing data corresponding to the CNC processing parameter based on a verification result of the simulated processing parameter, including:

when the simulated processing parameter does not pass verification, adjusting the simulated processing parameter until an adjusted simulated processing parameter passes the verification, and determining the adjusted simulated processing parameter as the CNC processing parameter, wherein the simulated processing parameter not passing the verification includes that the simulated processing parameter is unreasonable and/or inaccurate, and a unreasonable simulated processing parameter refers to a parameter that results in at least one of: there is a collision between a tool and parts that will processed, a processing accuracy of a simulated processing exceeding a processing capability of the tool, and a rotation speed exceeding a processing capability of a CNC processing device; and when the simulated processing parameter is unreasonable, adjusting a specific parameter that is unreasonable, including:

when there is the collision between the tool and the parts that will be processed, adjusting a tool route to avoid a portion that is colliding with the parts that will be processed; and when the rotation speed exceeds the processing capacity of the CNC processing device, reducing the rotation speed of the CNC processing device; and when the simulated processing parameter is inaccurate, finding out a position where a difference between size information in a simulated processing part and size information in processing drawing information is less than tolerance information, and taking a processing progress before processing the position as a current processing progress to input to an adjustment model to obtain the adjusted simulated processing parameter, wherein the adjustment model is a machine learning model, and the CNC processing parameter includes a tool feed step length, a selection of the tools, and the tool route;

controlling the CNC processing device of the perception control platform to perform the task based on the determined CNC processing parameter;

collecting actual processing data during a performance of the task according to a monitoring frequency by a monitoring device of the perception control platform, wherein the monitoring frequency includes a monitoring frequency of a sub-route of the tool route, and determining the monitoring frequency includes:

dividing the tool route to determine the sub-route;

determining, based on a CNC processing parameter of the sub-route, an estimated deviation value corresponding to the sub-route, wherein the estimated deviation value is an estimated maximum processing deviation value when processing the sub-route; and determining the monitoring frequency for the sub-route based on the estimated deviation value, wherein the monitoring frequency of the sub-route is negatively correlated with a difference between the estimated deviation value corresponding to the sub-route and tolerance information corresponding to a target processing part, when the estimated deviation value corresponding to the sub-route is not less than the tolerance information, the monitoring frequency of the sub-route is adjusted up to a maximum monitoring frequency value that is achieved by the monitoring device;

performing a deviation determination on the actual processing data and the simulated processing data, wherein the actual processing data includes actual coordinate positions of the tools, the deviation determination includes a single-point deviation determination and a multi-point deviation determination, and a processing alert instruction includes a first-level alert instruction and a second-level alert instruction; wherein the single-point deviation determination includes: in response to determining that a position deviation of the tool exceeds a first level deviation threshold, determining a position abnormity of the tool and generating the first-level alert instruction, or obtaining a pressure data sequence based on a pressure sensor of a perception control platform; determining deformation data for the parts that will be processed based on the pressure data sequence; determining a comprehensive deviation based on the deformation data and the position deviation; and in response to determining that the comprehensive deviation exceeds the first level deviation threshold, determining that a processing deviation is abnormal and generates the first-level alert instruction, the position deviation is a deviation between the actual coordinate position of the tool and the simulated coordinate position of the tool;

the multi-point deviation determination includes: in response to determining that the position deviation is between the first level deviation threshold and a second level deviation threshold, performing a multi-level determination based on a deviation point ratio, wherein the second level deviation threshold is less than the first level deviation threshold, and the multi-level determination includes:

in response to determining that the deviation point ratio exceeds a first level ratio threshold, determining the position abnormity of the tool and generating the first-level alert instruction;

in response to determining that the deviation point ratio is lower than the first level ratio threshold and higher than a second ratio threshold, determining the position abnormity of the tool and generating the second-level alert instruction; the second ratio threshold is lower than the first level ratio threshold;

in response to a result of the deviation determination satisfying a preset alert condition, generating the processing alert instruction and sending the processing alert instruction to an alert device of a user platform, wherein the alert device includes a screen, a loudspeaker, and a terminal device carried by a user that issues an alert, an alarm device issues an alarm based on the processing alert instruction, and the alarm includes a highlighting alerting and a voice alerting; and controlling the CNC processing device to adjust the tool feed step length based on the actual processing data, including:

determining a second position deviation based on the actual processing data; and adjusting the tool feed step length based on the position deviation.

2. The method of claim 1, wherein the method further includes:

generating a three-dimensional model of a product based on the actual processing data;

extracting measurement data of the three-dimensional model; and determining a processing quality of the product based on product size data and the measurement data.

3. A system for intelligent monitoring of computer numerical control (CNC) processing based on an Industrial Internet of Things (IoT), wherein the system comprises a user platform, a service platform, an industrial IoT management platform, a sensor network platform, and a perception control platform, wherein the industrial IoT management platform includes a production process management sub-platform, a data center, and a device management sub-platform, wherein the industrial IoT management platform is configured to:

obtain, based on an input device of the perception control platform, information corresponding to a task that will be completed;

determine a CNC processing parameter and simulated processing data corresponding to the CNC processing parameter by performing a CNC process simulation based on the information, including:

generating a simulated processing parameter based on the information;

generating a CNC processing program according to a programming rule based on the simulated processing parameter;

simulating the CNC processing program and recording the simulated processing data, wherein the simulated processing data includes simulated coordinate positions of tools;

verifying the simulated processing parameter based on the simulated processing data; and determining the CNC processing parameter and the simulated processing data corresponding to the CNC processing parameter based on a verification result of the simulated processing parameter, including:

when the simulated processing parameter does not pass verification, adjusting the simulated processing parameter until an adjusted simulated processing parameter passes the verification, and determining the adjusted simulated processing parameter as the CNC processing parameter, wherein the simulated processing parameter not passing the verification includes that the simulated processing parameter is unreasonable and/or inaccurate, and a unreasonable simulated processing parameter refers to a parameter that results in at least one of: there is a collision between a tool and parts that will processed, a processing accuracy of a simulated processing exceeding a processing capability of the tool, and a rotation speed exceeding a processing capability of a CNC processing device; and when the simulated processing parameter is unreasonable, adjusting a specific parameter that is unreasonable, including:

when there is the collision between the tool and the parts that will be processed, adjusting a tool route to avoid a portion that is colliding with the parts that will be processed;

when the rotation speed exceeds the processing capacity of the CNC processing device, reducing the rotation speed of the CNC processing device; and when the simulated processing parameter is inaccurate, finding out a position where a difference between size information in a simulated processing part and size information in processing drawing information is less than tolerance information, and taking a processing progress before processing the position as a current processing progress to input to an adjustment model to obtain the adjusted simulated processing parameter, wherein the adjustment model is a machine learning model, and the CNC processing parameter includes a tool feed step length, a selection of the tools, and the tool route;

control the CNC processing device of the perception control platform to perform the task based on the determined CNC processing parameter;

collect actual processing data during a performance of the task according to a monitoring frequency by a monitoring device of the perception control platform, wherein the monitoring frequency includes a monitoring frequency of a sub-route of the tool route, and to determine the monitoring frequency, the industrial IoT management platform is further configured to:

divide the tool route to determine the sub-route;

determine, based on a CNC processing parameter of the sub-route, an estimated deviation value corresponding to the sub-route, wherein the estimated deviation value is an estimated maximum processing deviation value when processing the sub-route; and determine the monitoring frequency for the sub-route based on the estimated deviation value, wherein the monitoring frequency of the sub-route is negatively correlated with a difference between the estimated deviation value corresponding to the sub-route and tolerance information corresponding to a target processing part, when the estimated deviation value corresponding to the sub-route is not less than the tolerance information, the monitoring frequency of the sub-route is adjusted up to a maximum monitoring frequency value that is achieved by the monitoring device;

perform a deviation determination on the actual processing data and the simulated processing data, wherein the actual processing data includes actual coordinate positions of the tools, the deviation determination includes a single-point deviation determination and a multi-point deviation determination, and the processing alert instruction includes a first-level alert instruction and a second-level alert instruction; wherein the single-point deviation determination includes: in response to determining that a position deviation of the tool exceeds a first level deviation threshold, determining a position abnormity of the tool and generating the first-level alert instruction, or obtaining a pressure data sequence based on a pressure sensor of the perception control platform; determining deformation data for the parts that will be processed based on the pressure data sequence; determining a comprehensive deviation based on the deformation data and the position deviation; and in response to determining that the comprehensive deviation exceeds the first level deviation threshold, determining that a processing deviation is abnormal and generates the first-level alert instruction, the position deviation is a deviation between the actual coordinate position of the tool and the simulated coordinate position of the tool;

the multi-point deviation determination includes: in response to determining that the position deviation is between the first level deviation threshold and a second level deviation threshold, performing a multi-level determination based on a deviation point ratio, wherein the second level deviation threshold is less than the first level deviation threshold, and the multi-level determination includes:

in response to determining that the deviation point ratio exceeds a first level ratio threshold, determining the position abnormity of the tool and generating the first-level alert instruction;

in response to determining that the deviation point ratio is lower than the first level ratio threshold and higher than a second ratio threshold, determining the position abnormity of the tool and generating the second-level alert instruction; the second ratio threshold is lower than the first level ratio threshold;

in response to a result of the deviation determination satisfying a preset alert condition, generate the processing alert instruction and send the processing alert instruction to an alert device of a user platform, wherein the alert device includes a screen, a loudspeaker, and a terminal device carried by a user that issues an alert, an alarm device issues an alarm based on the processing alert instruction, and the alarm includes a highlighting alerting and a voice alerting; and control the CNC processing device to adjust the tool feed step length based on the actual processing data, including:

determining a second position deviation based on the actual processing data; and adjusting the tool feed step length based on the position deviation.

4. The system of claim 3, wherein the management platform of an industrial IoT is further configured to:

generate a three-dimensional model of a product based on the actual processing data;

extract measurement data of the three-dimensional model; and determine a processing quality of the product based on product size data and the measurement data.

5. The method of claim 1, wherein the determining the CNC processing parameter further includes:

in response to an estimated comprehensive deviation exceeding the first level deviation threshold, determining a candidate processing parameter through the adjustment model based on the estimated comprehensive deviation, the first level deviation threshold, a current processing parameter, and the current processing progress;

verifying the candidate processing parameter; and determining the CNC processing parameter for the sub-route of the tool route based on a verification result of the candidate processing parameter.

6. The method of claim 1, wherein the dividing the tool route to determine the sub-route includes:

determining curvatures at different points on the tool route;

determining a curvature change value of two adjacent points; and clustering the points based on the curvature change value to determine the sub-route.

7. The method of claim 1, wherein the determining, based on a CNC processing parameter of the sub-route, an estimated deviation value corresponding to the sub-route includes:

determining the estimated deviation value using a deviation analysis model based on the CNC processing parameter of the sub-route, wherein the deviation analysis model is a machine learning model and includes a route feature layer and a deviation analysis layer; an input of the route feature layer includes the sub-route and the CNC processing parameter of the sub-route, and an output of the route feature layer includes a sub-route feature; an input of the deviation analysis layer includes the sub-route feature and an estimated deviation value of a previous segment of the sub-route, and an output of the deviation analysis layer includes the estimated deviation value corresponding to the sub-route.

8. The method of claim 7, wherein the deviation analysis model is obtained by jointly training the route feature layer and the deviation analysis layer, and the jointly training includes:

inputting a sample sub-route and a CNC processing parameter corresponding to the sample sub-route into an initial route feature layer to obtain an output sub-route feature from the initial route feature layer;

inputting the output sub-route feature from the initial route feature layer and an actual deviation value of a previous sub-route of a sample sub-route into the initial deviation analysis layer, and obtaining an output estimated deviation value from the initial deviation analysis layer;

constructing a loss function based on labels and the output estimated deviation value from the initial deviation analysis layer; and inversely updating model parameters of the initial route feature layer and the initial deviation analysis layer and obtaining a trained model based on the loss function until the trained model satisfies a preset training condition, wherein the preset training condition includes that the loss function is less than a threshold, converges, and a training period reaches a threshold, and a method of updating the model parameters includes a stochastic gradient descent.

9. The method of claim 1, wherein the determining the monitoring frequency for the sub-route based on the estimated deviation value further includes:

adjusting the monitoring frequency of the sub-route based on a difference between an estimated comprehensive deviation and the first level deviation threshold.

10. The method of claim 1, wherein the processing alert instruction further includes a warning instruction, the generating a processing alert instruction further includes:

obtaining temperature data of a surface of the parts that will be processed based on a temperature sensor;

predicting future deformation data based on a temperature data sequence and the pressure data sequence, wherein the temperature data sequence refers to a sequence composed of the temperature data during processing;

determining an estimated position deviation of the sub-route based on the estimated deviation value;

determining an estimated comprehensive deviation based on the future deformation data and the estimated position deviation; and in response to the estimated position deviation exceeding the first level deviation threshold, generating the warning instruction.

* * * * *